United States Patent
Pronko et al.

(10) Patent No.: US 6,787,723 B2
(45) Date of Patent: Sep. 7, 2004

(54) METHOD FOR LASER INDUCED ISOTOPE ENRICHMENT

(75) Inventors: Peter P. Pronko, Dexter, MI (US); Paul A. Vanrompay, Ann Arbor, MI (US); Zhiyu Zhang, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 218 days.

(21) Appl. No.: 10/086,304

(22) Filed: Feb. 28, 2002

(65) Prior Publication Data

US 2002/0166960 A1 Nov. 14, 2002

Related U.S. Application Data

(63) Continuation-in-part of application No. 09/914,401, filed as application No. PCT/US00/06077 on Mar. 9, 2000, now Pat. No. 6,586,696.
(60) Provisional application No. 60/177,135, filed on Jan. 20, 2000, and provisional application No. 60/125,942, filed on Mar. 24, 1999.

(51) Int. Cl.⁷ ............................................. B01D 5/00
(52) U.S. Cl. ..................................................... 204/157.2
(58) Field of Search ........................................ 204/157.2

(56) References Cited

U.S. PATENT DOCUMENTS

| | | | | |
|---|---|---|---|---|
| 4,199,685 A | * | 4/1980 | Hora et al. | 250/423 P |
| 5,751,113 A | | 5/1998 | Yashnov et al. | 315/111.21 |
| 5,845,880 A | | 12/1998 | Petrosov et al. | 244/169 |
| 5,847,493 A | | 12/1998 | Yashnov et al. | 315/231.31 |

FOREIGN PATENT DOCUMENTS

JP    06079141 A  *  3/1994   ........... B01D/59/34

* cited by examiner

*Primary Examiner*—Edna Wong
(74) *Attorney, Agent, or Firm*—Harness, Dickey & Pierce, P.L.C.

(57) ABSTRACT

Methods for separating isotopes or chemical species of an element and causing enrichment of a desired isotope or chemical species of an element utilizing laser ablation plasmas to modify or fabricate a material containing such isotopes or chemical species are provided. This invention may be used for a wide variety of materials which contain elements having different isotopes or chemical species.

28 Claims, 24 Drawing Sheets

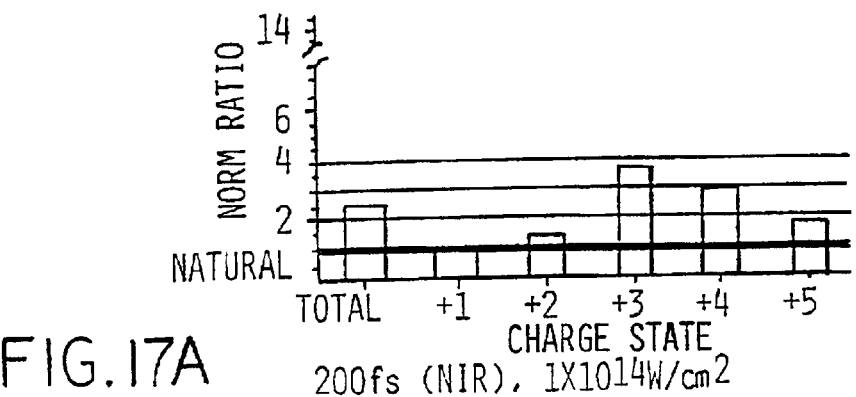
FIG.17A  200fs (NIR), 1X10$^{14}$W/cm$^2$
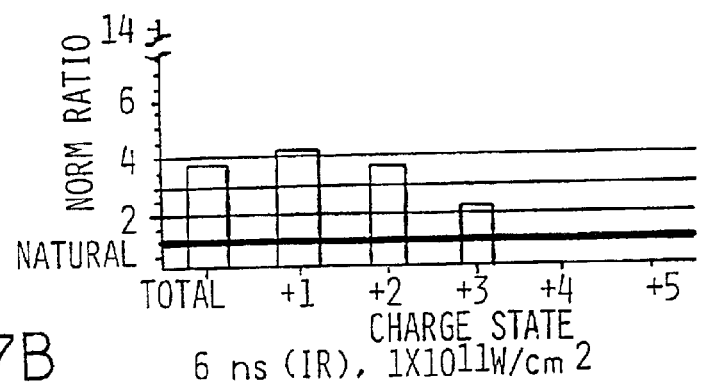
FIG.17B  6 ns (IR), 1X10$^{11}$W/cm$^2$
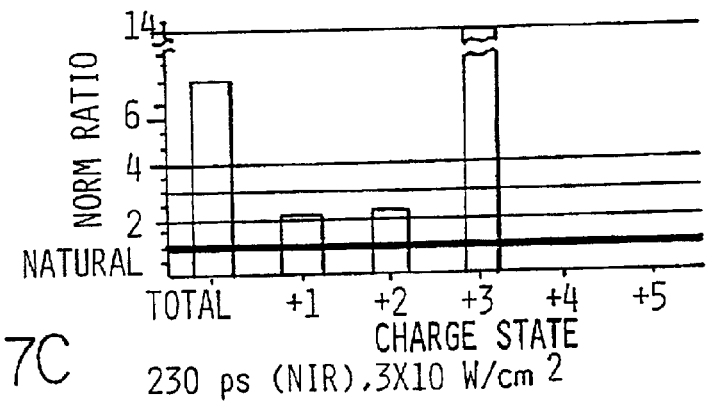
FIG.17C  230 ps (NIR), 3X10 W/cm$^2$
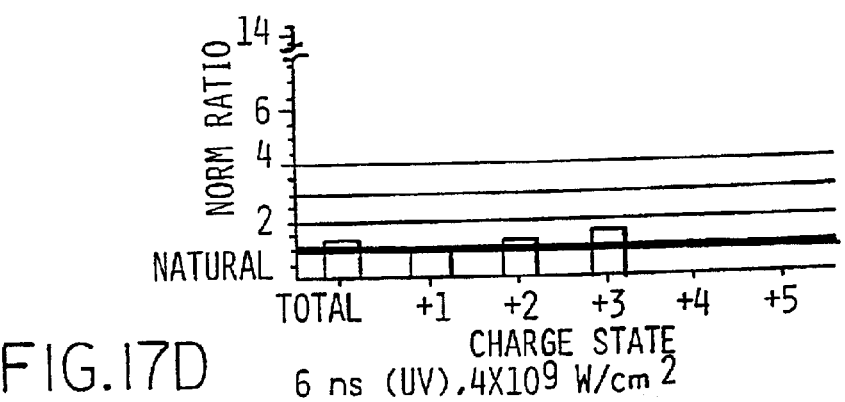
FIG.17D  6 ns (UV), 4X10$^9$ W/cm$^2$

FIG. 21

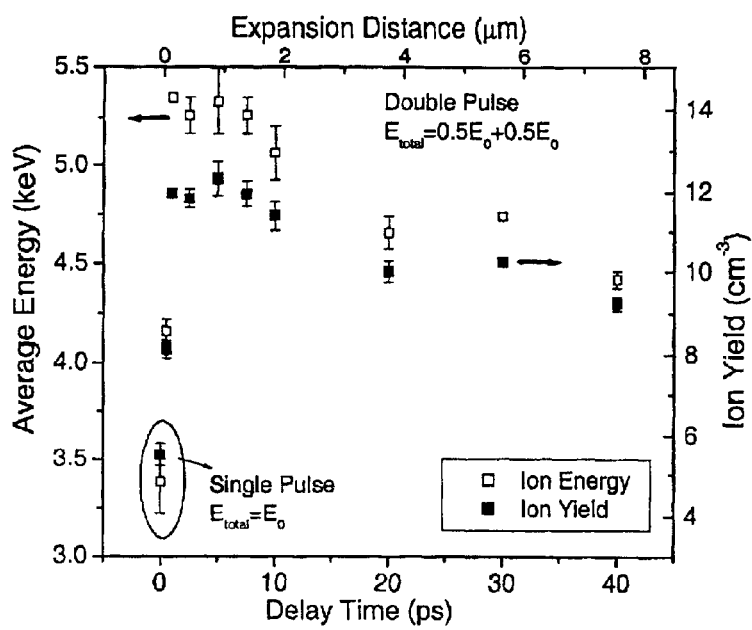

Fig. 1. Average ion yield and energy as a function of time-delay between two identical 120 femtosecond ablation pulses on silicon. The single pulse at zero delay has an energy fluence of 2.2 kJ/cm$^2$ on a beam spot diameter of 42 microns. The two double pulses have a fluence of 1.1 kJ/cm$^2$ each. Expansion distance based on measured average ion velocity of $1.9 \times 10^7$ cm/s

FIG. 22

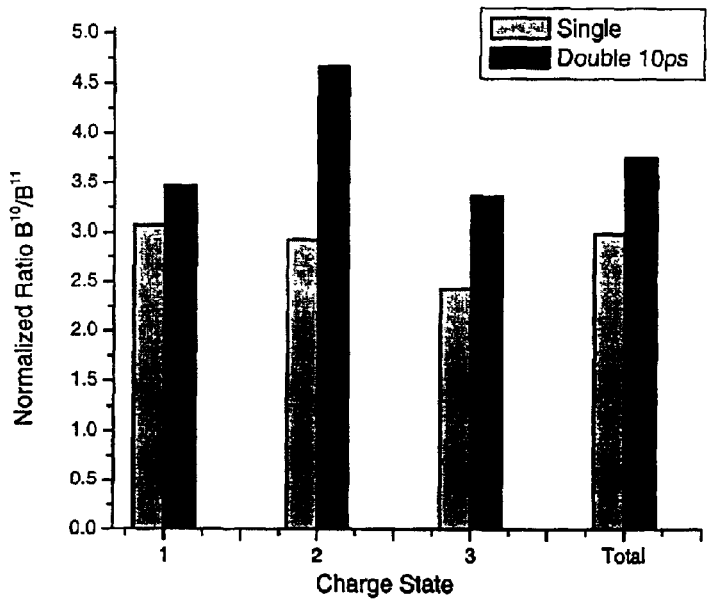

Fig. 1. Enhancement of isotope separation for boron ions in an ultrafast laser ablation plume. Single pulse: 2.2 kJ/cm$^{-2}$. Double pulse: 1.1 kJ/cm$^{-2}$ each pulse, separated by 10 ps. Laser pulses are 120 fs, 780 nm at 10 Hz. Total laser intensity: $2 \times 10^{16}$ W/cm$^2$. Natural abundance = 1.

METHOD FOR LASER INDUCED ISOTOPE ENRICHMENT

CROSS REFERENCE TO RELATED APPLICATIONS

This application is a continuation in part of U.S. application serial no. 09/914,401 filed Nov. 30, 2001, now U.S. Pat. No. 6,586,696, which is a 35 USC 371 filing of International Application No. PCT/US00/06077 filed Mar. 9, 2000, which claims benefit of 60/177,135, filed Jan. 20, 2000, and claims benefit of 60/125,942, filed Mar. 24, 1999.

GOVERNMENT RIGHTS

This invention was made with government support provided by the US Department of Energy through the Office of Basic Energy Science (Chemical Sciences) under contract no. DE-FG02-01ER and through the National Science Foundation under Contract Number PHY-8920108. The government has certain rights in the invention.

FIELD OF THE INVENTION

This invention relates to methods for isotope enrichment.

BACKGROUND OF THE INVENTION

Selected isotopes are useful in a variety of applications. For example, it is often desired to have an isotopic marker present in a molecule to trace such molecule in biologic processes. Radioactive isotopes are used for curative purposes in cancer and for medical radiology. Isotopic enrichment is used by industry to control physical properties of materials such as thermal conductivity. Separation of isotopes is conventionally accomplished by a variety of means relying on difference in mass of isotopes. One example of this utilizes a gaseous diffusion process to separate heavier components of an isotopic mixture from the lighter components by reason of their differing mass. Physical separation by fractionation to isolate a particular desired isotope is also known. Conventionally, the most popular procedure for isotope enrichment is the gaseous-diffusion method, which depends on the relative rates of gaseous diffusion through molecular barriers by different isotopes of a given element. Such processes typically operate at reduced pressure and elevated temperature. Often the difference between the mass of the isotopes is very small and although the lighter weight isotope diffuses more rapidly through porous barriers, the separation by each barrier is very, very small, therefore, many or a cascade of barriers are required.

More recently, there has been an interest in attempting to cause isotope separation by multiple photon absorption and photoionization. These processes are labor intensive and difficult to accomplish. Typically, several iterations are required to achieve the high concentration of the desired isotopic component in the separated product. An example of separation by multiple photon absorption can be found in U.S. Pat. No. 4,655,890 where a mixture of molecules is irradiated with infrared laser radiation having a first wavelength which lies in close coincidence with the transition from the ground rotation-vibration level of the molecules which contain the isotopic variant of the element which is to be separated, and the next highest rotation-vibration level having vibrational excitation. This radiation selectively induces multiple photon absorption by those molecules. Then it is possible to cause the selectively excited molecules to undergo chemical reaction while other isotopic variance of the element remains substantially in their lower rotation-vibration levels and consequently unreactive, thereby causing a product of the chemical reaction of the selectively excited molecules to be produced and separable from the unreacted molecules.

In the parent of the present application, a novel process and system apparatus were described for separating isotopes of an element and causing enrichment of a desired isotope of an element in a material. In one aspect, a laser was used to modify or fabricate a material so as to produce a desired isotopic content in the material, which differs from that which naturally occurs.

Isotope enrichment in laser ablation plumes is predominantly an ionic process. Such a process involves the interaction of energetic ions produced in the ablation plasma with self generated magnetic fields in the same plasma. Details about the theory of this self generated magnetic field process and its effects on the motion of isotopic ions in an ablation plasma continue to be studied and worked out. However, it is recognized that by maximizing the ionic component of the plasma, the number density of isotopes that undergo the enrichment process can be increased.

Referring to FIGS. 19A and 19B, it can be seen that the ratio of ions to neutrals in a single ablation plasma plume is relatively small. Typically that ratio is on the order of 1% or less. To achieve a practical method for using this phenomenon as a way to harvest enriched isotopes, it would be desired to increase this ionic component to much greater levels.

A single laser ablation plume is the result of a number of relatively complex processes occurring during the absorption of a laser pulse by a material and subsequent expansion of the gaseous/plasma plume. One part of this process involves the initial production of a very large percentage of ions if not complete ion content in the vapor phase plasma. In other words, the system starts out as a fully ionized electron-ion plasma. Because of the high initial density and ensuing collisions in at the early vapor/plasma stage, however, a great deal of electronic neutralization occurs as the plasma expands away from the surface of the ablating material. This highly neutralized plasma then moves through the region of the self-generated magnetic field and the ionic component undergoes the isotope enrichment.

A plasma having a density which exceeds a certain level, known as the "critical density", begins to reflect optical radiation rather than absorb it. The absorption properties of a plasma normally increase with the density of free electrons in it. However, when the density reaches the critical density the plasma becomes nearly totally reflective. This limits the amount of internal energy that can be added to a plasma by a laser pulse. In most cases where an ablation plasma is formed by a laser this critical density is achieved in the early part of the laser pulse impinging on the surface of the material.

SUMMARY OF THE INVENTION

The present invention provides a novel process and system apparatus for separating isotopes of an element and causing enrichment of a desired isotope of an element in a material. In one aspect, the invention utilizes lasers to modify or fabricate a material so as to produce a desired isotopic content in the material, which differs from that which naturally occurs. The reference to a condition different from that which naturally occurs refers to both enhancement and depletion.

In a preferred embodiment, the present invention relies upon laser induced formation of a plasma by means of a pulsed laser beam. The material containing the isotopes desired to be separated is placed in the beam path and is called a target. A plasma is formed from the target material by focusing an intense, short duration optical pulse from the laser onto the target. The concentrated energy contained in the focused and/or concentrated laser beam ionizes the target material, energizing its electrons and raising it to a temperature or otherwise exciting it to a condition whereby ions are produced, thereby generating a plasma. The plasma contains ions having varying isotopes, ion energy and charge state distributions. In one aspect, the ions are contained in a plasma plume generated when laser pulses are directed to a target. The process and system of the invention produce an unusual isotopic enhancement effect in the observed ion spectra. This effect is manifested as an enrichment of the lighter isotope in zones of the ablation plume, as observed normal to the surface of the target material.

In one aspect, the method comprises directing the laser beam to the target at an intensity and wavelength sufficient to generate the plasma comprising ionized isotopic species and to generate an internal electromagnetic scattering field within the plasma causing spatial separation of the ionized isotopic species. In another aspect, the ions are collected on a substrate in a manner which provides zones having isotopic distribution different from that which naturally occurs for a given element contained in the target. It is preferred that the pulses which generate the plume be produced by an ultrafast laser (femtosecond or picosecond). It is preferred that the laser generates the plume by ablation or laser induced breakdown (LIB) of the target material.

In another aspect, the method comprises directing an initial pulse of the laser beam to the target at an intensity and wavelength sufficient to generate the plasma comprising ionized isotopic species and to generate an internal electromagnetic scattering field within the plasma causing spatial separation of the ionized isotopic species. The dense plasma is then allowed to expand so that its volume increases and its electron density decreases. This brings the density of the plasma equal to or less than the critical density. During the expansion process a certain degree of neutralization occurs in the plasma which additionally reduces the free electron concentration. After allowing the expansion to occur, a time delayed second pulse of the laser beam is directed to the plasma to further spatially separate the ionized isotopic species. By correctly delaying the time of the second pulse, additional energy is absorbed by the plasma and the ionic component increases.

The invention provides substantial advantages over conventional methods for separating isotopic components of an element. The invention further provides the ability to effectively enhance the isotopic content of a material as compared to the natural state. Products having desired isotope distribution are able to be produced from the process. The process and system are adaptable to commercial use and automated production. Therefore, isotope enriched products are obtainable by the methods and system of the invention.

Objects, features, and advantages of the invention include, in addition to the foregoing, an improved method and system for separating isotopes of an element, and particularly for forming product material having a desired isotopic content different from that which naturally occurs.

Another object is to provide a method for producing spatial isotopic separation.

Another object is to provide a method and system which utilize lasers to achieve isotope separation or enrichment at certain ablation or scattering angles.

Another object is to provide a method and system which utilize lasers to achieve isotopic separation or isotopic enrichment of a product.

Another object is to provide a method and system for producing products having a desired isotopic distribution.

Another object is to provide a method and system which effectively and economically achieve isotopic separation and isotopic enhancement in a product material.

Another object is to provide a method and system which applies the technique of isotopic separation to chemical element separation.

These and other objects, features, and advantages will become apparent from the following description of the preferred embodiments and accompanying drawings.

BRIEF DESCRIPTION OF THE DRAWINGS

FIG. 2 shows individual charge states and kinetic energies for the ionic isotopes of boron obtained from a boron nitride target in a vacuum. The data of FIG. 2 was captured in the experimental apparatus as shown in FIG. 1. The laser pulse was supplied by a Ti:Sapphire CPA system.

FIG. 3 shows the charge state and energy distribution data for boron ions and its isotopes, as compiled from spectra such as that on FIG. 2. FIG. 3 has two parts. In FIG. 3 for the ion species of nitrogen, boron 10, and boron 11, there is shown data obtained from a cross sectional area transverse to the direction of ion movement and normal to the surface of the target. The data shows ion density in ions per square centimeter as a function of ion kinetic energy expressed in keV. The data of FIGS. 2 and 3 were obtained under the conditions of boron nitride ablation with laser pulses of 200 femtoseconds, 780 nanometers, 4 millijoules (mJ), 100 micron spot size, corresponding to $2.5 \times 10^{14}$ watts per square centimeter.

FIG. 4 shows data obtained in a cross sectional area transverse to the direction of ion movement and normal to the surface of the target. The data cross section shows ion density versus ion energy level similar to FIG. 3; and two conditions are shown, generation of the plume under vacuum (4A) and generation of the plume in a vacuum but with a partial pressure of nitrogen background gas (FIG. 4B). The laser pulse was supplied by an Nd:YAG laser system. The experimental system was otherwise as per FIG. 1.

FIG. 5 shows ion density similar to FIGS. 3 and 4, and using two conditions, in a vacuum (5A) and in a vacuum with nitrogen background gas (5B). The laser pulse was supplied by a Ti:Sapphire laser system. The experimental system was otherwise as per FIG. 1.

FIG. 7 shows individual charge states and kinetic energies for the ionic isotopes of gallium obtained from a gallium nitride target in a vacuum. The data of FIG. 7 was captured in the experimental apparatus as shown in FIG. 1. The laser pulse was supplied by a Ti:Sapphire CPA system.

FIG. 8 shows the charge state and energy distribution data for gallium ions and its isotopes, as compiled from spectra such as that on FIG. 7. FIG. 8 has two parts. In FIG. 8 for the ion species of gallium 69 and gallium 71, there is shown data obtained from a cross sectional area transverse to the direction of ion movement and normal to the surface of the target. The data shows ion density in ions per square centimeter as a function of kinetic energy expressed in keV. The data of FIGS. 7 and 8 were obtained under the conditions of gallium nitride ablation with laser pulses of 150 femtoseconds, 780 nanometers, 3.3 joules per square centimeter.

FIG. 9 shows plots of the ratios of $Ga^{69}/Ga^{71}$ for three cases.

FIG. 11 is a schematic representation of the data showing that the ratio of B(10) to B(11) in a central portion of the plume is greater than natural abundance.

FIG. 12 contains results for two samples, one designated as curve 6 and the other as curve 7. Curve 6 is for a relatively thin deposition zone of the sample and curve 7 is for a sample taken from a relatively thick zone of the deposited film (FIG. 11). Both sample spots of the film are on the order of 3 millimeters in diameter. The actual spots being analyzed on the film were separated by 5 spot diameters or 15 mm (i.e., 1.5 cm).

FIG. 13 contains data for a sample taken from a relatively thick zone of the deposited film. The sample spot on the film was on the order of 3 millimeters in diameter.

FIG. 14 consists of parts A, B and C. FIG. 14 charts B, C are RBS spectra similar to that shown in FIGS. 12 and 13 but with the Si background subtracted out. The solid lines are mathematical best fit curves based on the commercially available RUMP computer program available through Cornell University.

FIG. 17 shows isotopic ratios for boron as observed on the normal axis in various laser plasma plumes. Ratios are for B10/B11. Natural abundance ratio (0.25) is normalized to unity. Pulse durations, wavelengths and intensities are: (a) at 200 fs (NIR), $1\times10^{14}$ W/cm²; (b) at 6 ns (IR),$1\times10^{11}$ W/cm²; (c) at 230 ps (NIR), $3\times10^{10}$ W/cm²; and (d) at 6 ns (UV), $4\times10^{9}$ W/cm²; and where NIR=780 nm, IR=1.06 μm, V=353 nm.

FIG. 21 is graph illustrating average ion yield and energy as a function of time-delay between two identical 120 femtosecond ablation pulses on silicon. The single pulse at zero delay has an energy fluence of 2.2 kJ/cm² on a beam spot diameter of 42 microns. The two double pulses have a fluence of 1.1 kJ/cm² each. Expansion distance based on measured average ion velocity of $1.9\times10^7$ cm/s FIG. 22 is a graph illustrating enhancement of isotope separation for boron ions in an ultrafast laser ablation plume. Single pulse: 2.2 kJ/cm$^{-2}$. Double pulse: 1.1 kJ/cm$^{-2}$ each pulse, separated by 10 ps. Laser pulses are 120 fs, 780 nm at 10 Hz. Total laser intensity: $2 \times 10^{16}$ W/cm$^2$. Natural abundance=1.

DETAILED DESCRIPTION OF THE PREFERRED EMBODIMENTS

Figure 1:
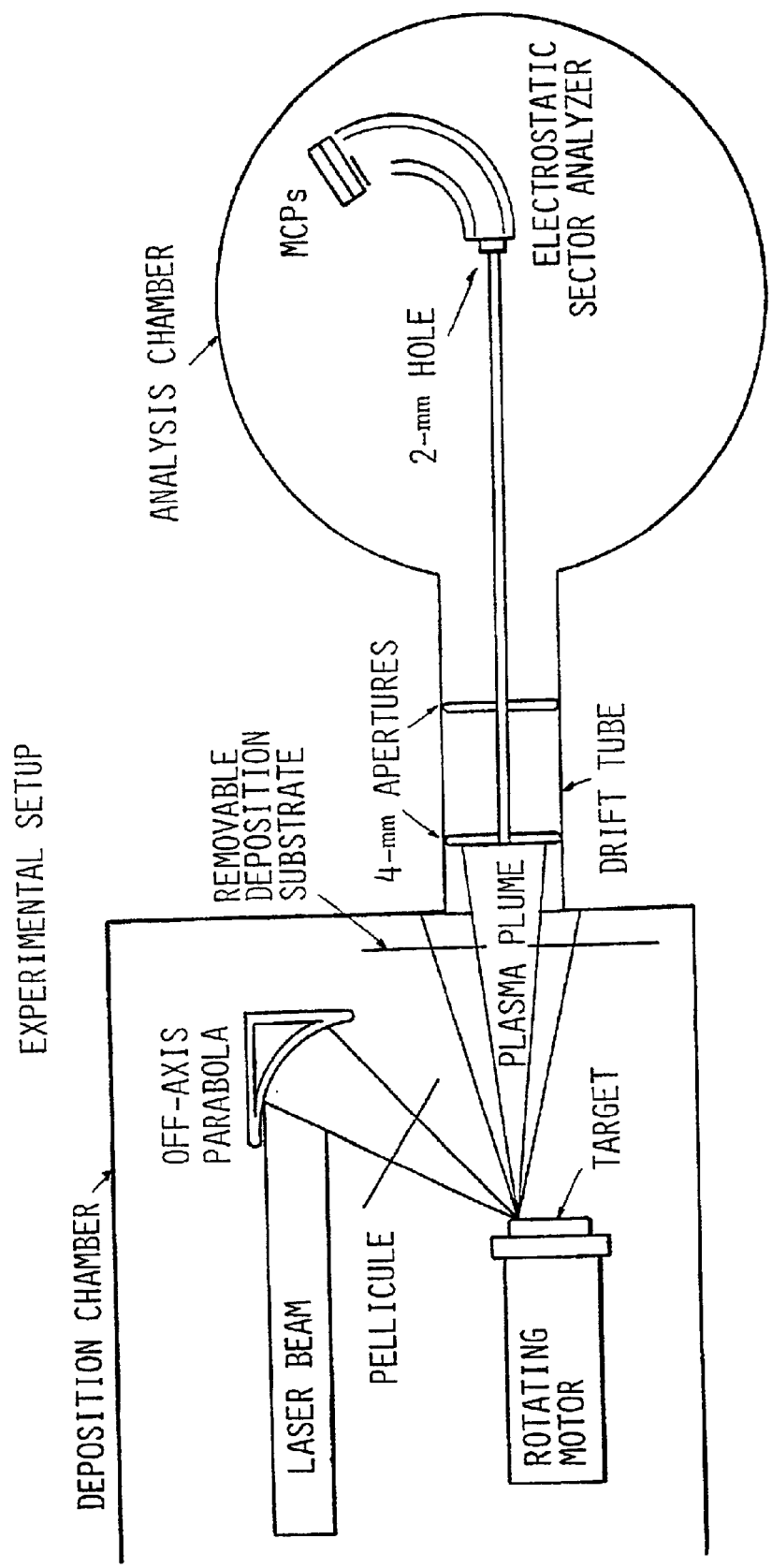
FIG. 1 is a schematic of a system for generating a plume containing ionized particles. It includes a deposition chamber which is preferentially under vacuum (but could be operated with a background gas at various pressures) and an analysis or collection chamber. An incoming laser beam is provided from an external laser source.

The invention provides new methods for separating isotopes of an element and causing enrichment of a desired isotope of an element utilizing lasers to modify or fabricate a material containing such isotopes. This invention may be used for a wide variety of materials which contain elements having different isotopes. Before further describing the invention, it is useful to understand the problem to which the invention is directed. In nature, elements such as boron, gallium, magnesium, carbon and many others, occur in stable isotopic form. For example, boron has two isotopes; boron 10, B(10), and boron 11, B(11). Nuclei with the same number of protons but different number of neutrons are called isotopes of each other. Therefore, isotopes of a given element have the same nuclear charge (protons), but the differing number of neutrons results in a differing atomic mass. For a given element, the amount of an isotope in its naturally occurring mixture of isotopes, is represented by a term designated as percent natural abundance. These natural abundance values are reported in a variety of Standard Chemistry and Physics Handbooks and other sources. Using boron as an example, it is known that boron 10 has a natural abundance on the order of 19.78% and boron 11 is about 80.22%. It is often desired to obtain a material enriched with one of the isotopes relative to the condition found in the natural state.

In one aspect, the present invention utilizes laser heating and other forms of laser induced breakdown of a material to cause ablation and formation of a plasma by means of a pulsed laser beam. Pulsed rather than continuous beams may be more effective for many procedures, including the formation of an ablation plume from a material containing isotopes desired to be separated. A pulsed laser beam comprises bursts or pulses of light which are of very short duration, for example, on the order of nanoseconds in duration or less. Typically, these pulses are separated by periods of quiescence. The peak power of each pulse is relatively high, capable of intensity on the order of $10^9$ to $10^{17}$ watts/cm$^2$. The present invention utilizes one or more laser pulses having selected pulse width, repetition rate, wavelength and intensity of the laser beam at the plasma-forming material, to form a plasma of the material. Under certain circumstances, continuous laser beams are also thought to be useful for the above purposes. Such continuous wave (CW) lasers are preferably operated in a range of 10 microns to 200 nanometer wavelength and average energy in the range of joules to hundreds of joules.

The material containing the isotopes desired to be separated is placed in the beam path and is called a target. A plasma is formed from the target material by focusing or otherwise delivering an intense, optical pulse from the laser onto the target. The concentrated energy contained in the focused laser beam is absorbed by the target material, energizing its electrons and raising it to a temperature or other form of excited state whereby ions are produced thereby generating a plasma. The extent of material affected by the laser pulse is dependent upon a number of factors including pulse duration, energy, and wavelength.

The invention provides a method and system apparatus, including laser, for producing ions having varying isotopic, ion energy and charge state distributions. In one aspect, the ions are contained in a plasma plume generated when one or more laser pulses are directed to a target. In another aspect, the ions are collected on a substrate in a manner which provides zones having isotopic distribution different from that which naturally occurs for a given element contained in the target. It is preferred that the pulses which generate the plume be produced by an ultrafast laser (femtosecond or picosecond) which generates the plume by ablation or laser induced breakdown (LIB) of the target material. Such ultrafast pulses, however, are not thought to be the only way to optimize the process.

Thus, the process and system of the invention produce an unusual isotopic enhancement effect in the observed ion spectra. This effect is manifested as an enrichment of the lighter isotope in zones of the ablation plume, as observed normal to the surface of the target material. The relative intensity of this effect was observed to vary with the charge-state and energy of the ions.

Generation and Analysis of the Plume

The process of the invention has been utilized to produce boron and gallium isotopes in respective ablation plumes coming from boron nitride and gallium nitride solid target. The plume was generated in a system as schematically shown in the diagram of FIG. 1. As shown in FIG. 1, a laser beam was supplied to the deposition chamber which contained the target. In the experiments described herein, the laser beam was generated by one of two types of laser systems. One was an ultrafast Ti:Sapphire-based laser system developed at the Center for Ultrafast Optical Science (CUOS) for the femtosecond and picosecond data sets. The other one was a commercial Nd:YAG Laser for the nanosecond data set.

Nominally, the ultrafast laser system produces 100 femtosecond amplified laser pulses at 10 Hertz and a wavelength of 780 nanometers. The pulse energy can be as high as 100 millijoules and with a peak-to-background contrast as high as $10^8$. The laser system consists of a number of components and utilizes chirped-pulse amplification (CPA). CPA avoids damage in amplifier media by reducing the peak intensity during amplification. The ultrashort pulse is stretched in time by chirping the pulse, that is, giving the pulse a time-varying wavelength. The stretched pulse is amplified and then recompressed to give an amplified, ultrashort pulse.

The oscillator is a commercial Ti:Sapphire system from Clark-MXR, Inc. which is pumped by a CW (continuous-wave) Argon laser, also commercial. The mode-locked oscillator produces 50-femtosecond pulses at 100 MegaHertz with a pulse energy of 2 nanojoules. The bandwidth and center wavelength are tunable and are nominally 15 nanometers and 780 nanometers, respectively. A Pockels cell is used to reduce the repetition rate to 10 Hertz which is the (nominal) maximum rate this particular system can handle due to thermal effects.

The oscillator pulse is stretched in time to 230 picoseconds by a grating-based stretcher. The efficiency of the stretcher is 50% and its output is a 1-nanojoule, 230-picosecond pulse. The amplification chain consists of three amplifiers. (1) The regenerative amplifier is a Ti:Sapphire laser cavity pumped by 5 millijoules of the doubled frequency of a Nd:YAG laser (532 nanometers). It can amplify the pulse nominally from 1 nanojoule to 1 millijoule. (2) The two-pass amplifier is a Ti:Sapphire crystal pumped by 120 millijoules of the same Nd:YAG laser used for the regenerative amplifier. Two passes in this crystal amplifies the pulse from 1 millijoule to 20 millijoules. (3) The four-pass amplifier is a Ti:Sapphire crystal pumped by two high-power Nd:YAG lasers (at a doubled frequency of 532 nanometers). The total pump energy is 1.2 joules and can amplify the pulse from 20 millijoules to 200 millijoules. The pulse is then recompressed by a grating pair to a nominal pulse width of 100 femtoseconds. The compressor is in a vacuum chamber to avoid self-phase modulation and other nonlinear effects of the high-intensity pulse in air. The compressor has an efficiency of 50% and outputs 100-femtosecond, 100-millijoule pulses. Background concerning CPA laser systems and lasing using short optical pulse can be found in U.S. Pat. Nos. 5,235,606 and 5,656,186, incorporated herein by reference in their entirety.

In the experiments described here, two outputs of the above-described laser system were used: (1) the ultrashort pulse which is 780 nanometers and has a duration of 150 or 200 femtoseconds; and (2) the stretched, amplified pulse which is 780 nanometers and has a duration of 230 picoseconds.

The nanosecond laser used in this research is a Continuum Surelite I Nd:YAG laser which has a nominal pulse width of 6 nanoseconds at a wavelength of 1.06 microns and a pulse energy of 450 millijoules.

For the experiments, the beam had pulse widths in the nanosecond (ns) to femtosecond (fs) range, repetition rate on the order of 10 Hz, intensity in the range of $10^{10}$ to $10^{15}$ watts per square centimeter (w/cm$^2$), and wavelength on the order of one micron. The laser beam was focused and directed to the target through a lens.

The laser pulse was directed at the target at an angle to the target of approximately 45 degrees. The laser beam ablated the target material and generated a plume. The specific angle of laser impingement on the target is not thought to be critical. However, it is important to note that the ablation plume leaves the surface of the material in a direction that is essentially normal to the surface, that is, at a 90 degree angle to the surface. The target could be any material including amorphous or crystalline solids, liquids or gases including high density plasma/gas state. The examples described herein were solids.

The center of the plume was directed toward a set of apertures that acted as collimating devices and introduced the ions into the ion energy analyzer. This analyzer was a conventional curved (spherical) sector plate electrostatic energy analyzer. When it was operated in a time of flight mode, through synchronization with the laser pulse, the analyzer was also capable of uniquely separating ion charge states. Discrete energy distributions of the individual charge states for ions in the ablation plume were obtained by sweeping the analyzing voltage on the sector plates and using time of flight synchronization.

Monitoring Ion Charge, Energy and Distribution of Charge and Energy

The energies and charge-states in the ablation plume reported herein were measured using a spherical-sector electrostatic energy analyzer. The ions entered the analyzer and passed between two curved spherical-sector plates. A voltage up to 5000 volts was placed on each of the plates. An ion passing between the plates is influenced by this voltage which curves the path of the ion. The magnitude of this force depends on the voltage on the plates and on the charge-state and energy of the ion. Specifically, for a certain voltage difference on the plates, only ions with a certain energy-to-charge ratio will follow the path and reach the detector (the MCPs). In the geometry of this analyzer, the energy-to-charge ratio (E/q) of the selected ions is equal to 2.254 times the voltage difference ($V_{diff}$) between the spherical-sector plates which gives the equation: $(E/q)_{selected}=2.254 \times V_{diff}$ where E/q is in units of electron volts (eV), and $V_{diff}$ is in volts (V). For positive ions, a negative voltage was placed on the inner plate and a positive voltage on the outer plate.

A specific voltage difference between the plates gives ions with a particular energy-to-charge ratio. The detector will observe a charge state 1 ion with a specific energy E as determined by the sector plate voltage and will also observe a charge state 2 ion at an energy of 2E. However, ions with differing charge-states are detected at differing times after the laser pulse. This follows since an ion with twice the charge-state and twice the energy travels at a faster speed, that is, 1.414 times faster because energy is related to the square of the speed. Thus, the higher-energy ion arrives earlier. This technique which used the arrival time after the laser pulse, to analyze the detected signal, is called spectral time-of-flight analysis.

In order to obtain the entire distribution of ions over energy and charge-state, the voltage difference on the sector plates was scanned from 0 to 10,000 volts. Each voltage difference gave a set of charge-states and energies as described above. A computer program is used to select the individual charge-states at each sector plate voltage difference and to assemble the ion energy and charge-state distributions. These distributions of ion energies and charge-states depend on the parameters of the laser pulses as defined herein. The isotope enrichment process was observed both in the ion distributions of the plume and in the spatial patterns, from the deposition and growth process, on the thin films.

Figure 2:
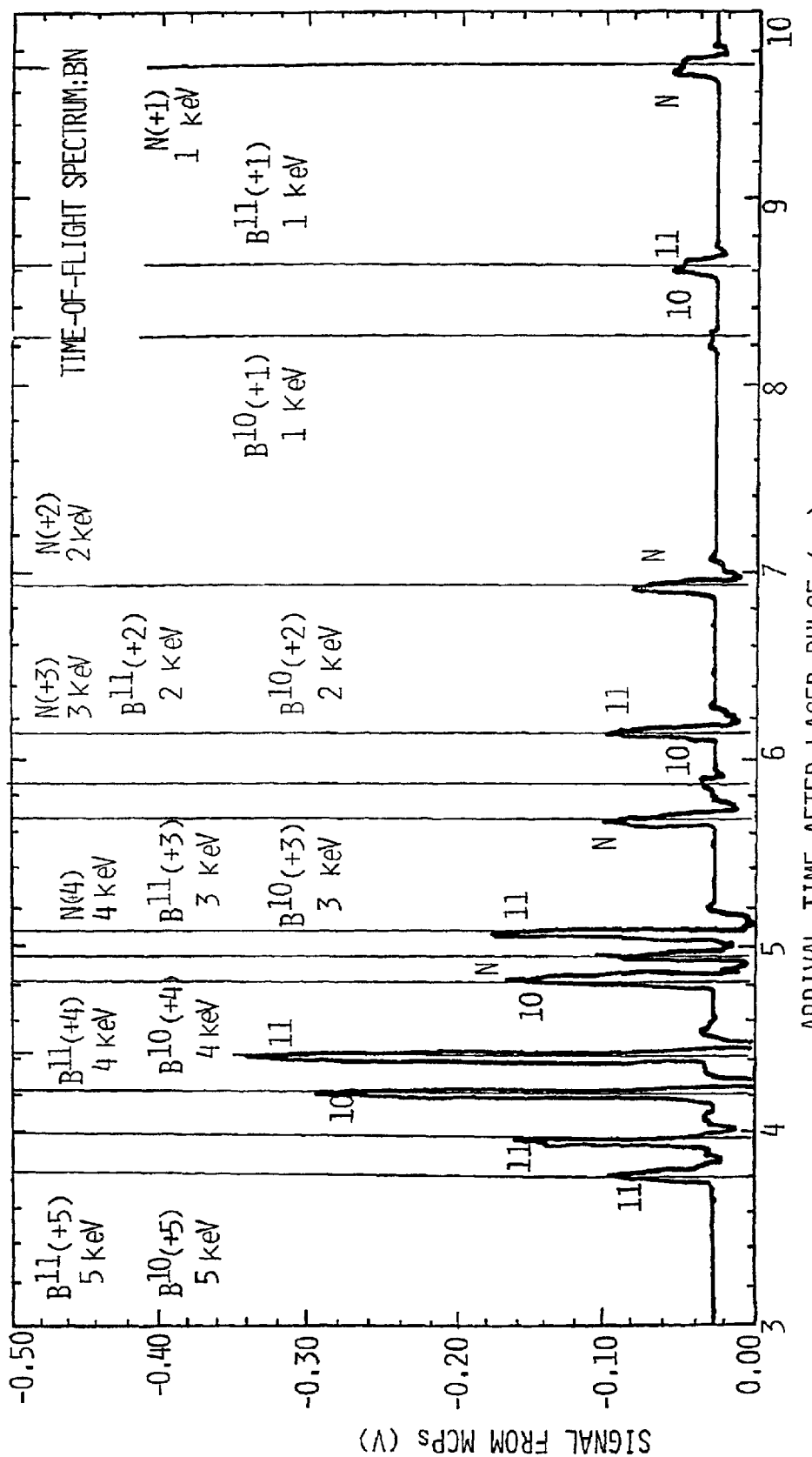
FIG. 2 is a graph showing the signal from the microchannel plate (MCP) of the ion energy analyzer in units of voltage as a function of arrival time after the laser pulse in microseconds.

A typical spectrum is shown in FIG. 2 for boron nitride where the boron isotopes are shown along with the nitrogen ions. For the case of a boron nitride target, the two stable isotopes, boron 10 and boron 11, were easily observed. Their natural abundance is 19.78% and 80.22%, respectively. Relative isotopic ratios in the ablated plume are observable in these spectra as a function of ion charge state and ion energy.

FIG. 2 shows data obtained at a fixed voltage on the sector plates and using time of flight synchronization to build up discrete energy spectra of the individual charge states for ions in the ablation plume. Here, the signal from the MCP (micro channel plates) of the detector was plotted as the function of arrival time after the laser pulse shown in microseconds. This data was obtained under vacuum conditions. This data was obtained using pulse width of 200 femtoseconds, wavelength of 780 nanometers, repetition rate of 10 Hz, and 4 millijoules (mJ) energy per pulse using the Ti:Sapphire laser. The data of FIG. 2 was captured in a vacuum by the experimental apparatus shown in FIG. 1. The intensity of the laser beam incident on the target was about $2.5 \times 10^{14}$ watts per square centimeter.

Referring to FIG. 2 and bearing in mind that the natural abundance ratio of boron 10 to 11 is on the order of 20:80, it can be seen that enrichment of a specific isotopic species within a zone of the plume is achieved. More specifically, FIG. 2 shows boron 10 B(10) and boron 11 B(11) at the +4 charge condition captured approximately 4 microseconds after the laser pulse. Here, the occurrence of B(10) and B(11) is about the same. In other words, at the +4 charge condition corresponding to 4 keV, the number of B(10) isotopes, as shown by the B(10) peak, is approximately the same as the number of B(11) isotopes. This distribution of B(10) and B(11) at the +4 charge state shows an occurrence of B(10) that is 4 times more than its naturally occurring abundance with respect to B(11). Therefore, there was clearly a zone within the plume that contained an enriched fraction of B(10) with respect to B(11) as compared to the naturally occurring amount. The distribution captured for B(10) and B(11) in the +1 charge state at about 1 keV, is shown in the vicinity of 8-9 microseconds after arrival of the laser pulse. In the graph at close to 9 microseconds, there is shown a peak for B(11) and close to 8 microseconds, there is shown a peak for B(10). The relative proportion of B(10) to B(11) at this segment shows that there is more B(10) relative to B(11) than the naturally occurring amount. This is even more clearly seen in FIG. 3A, where the ratio of B(11):B(10) is always less than 4:1 and often at about 1.5:1. The naturally occurring amount of B(11) to B(10) is 4 to 1(80:20). This enrichment at essentially all charge states +1 to +5 occurred because the aperture permitted passage of the rich B(10) part of the plume to the detector. Correspondingly, B(10) lean parts of the plume did not reach the detector. Since isotopic species were not created or destroyed in the process, it follows that there are probably zones within the plume or remaining target material which are relatively deficient in B(10) and relatively enriched in B(11).

Figure 3A:
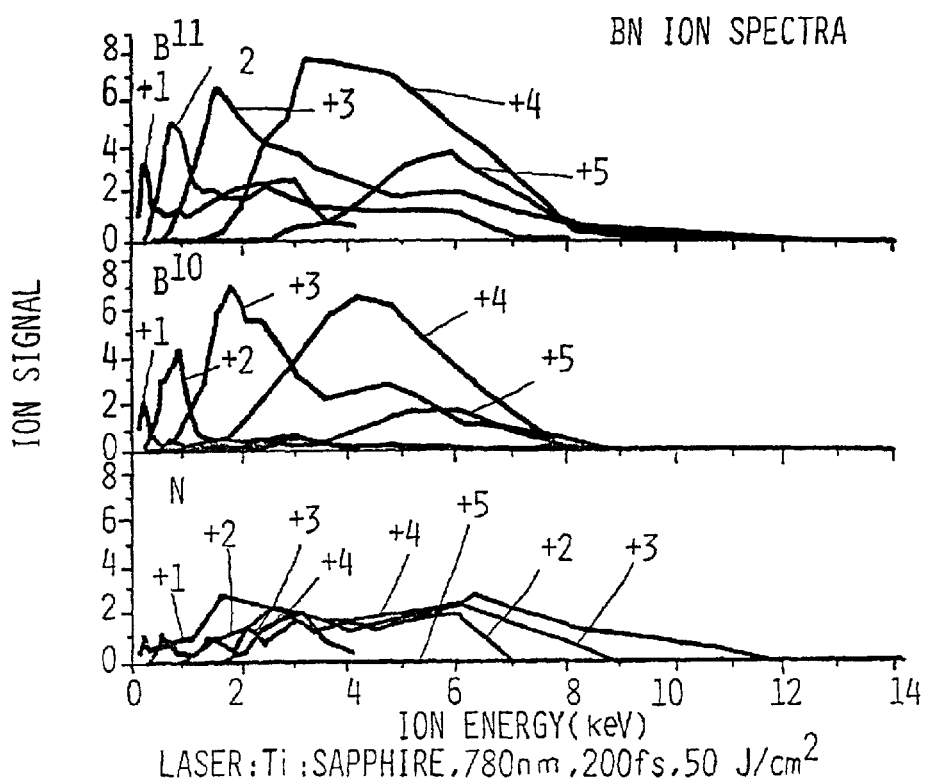
FIG. 3A shows data obtained in the experimental apparatus of FIG. 1 where the deposition chamber was under vacuum.
Figure 3B:
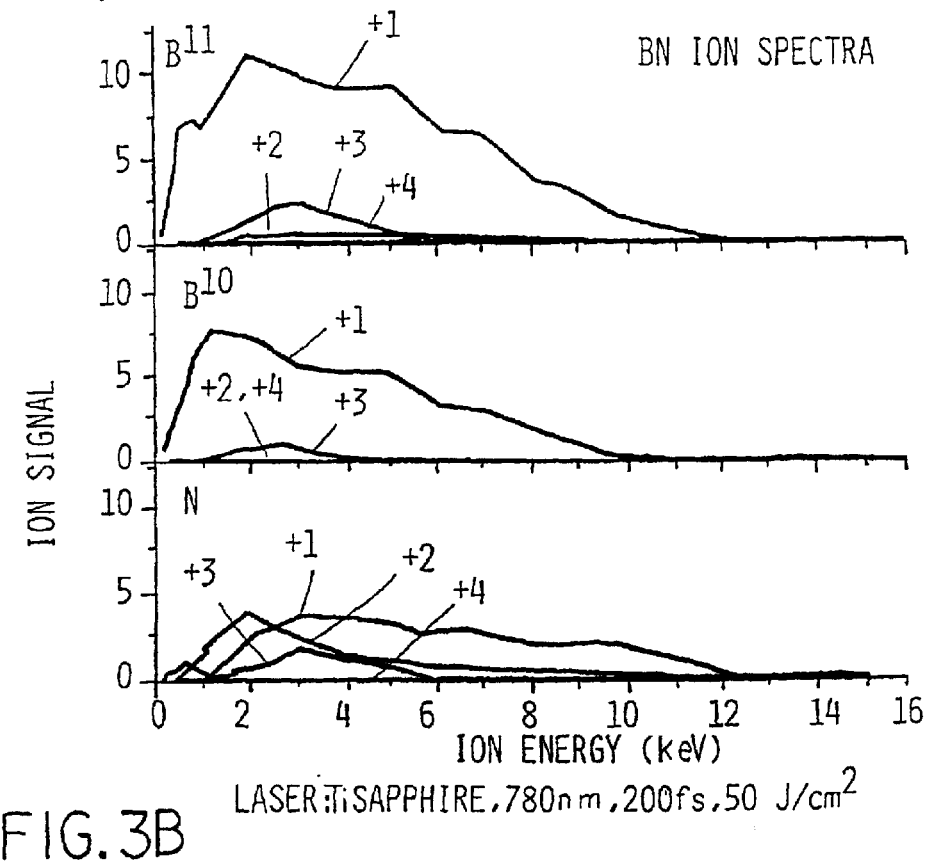
FIG. 3B shows data obtained in the same experimental configuration and under the same conditions except that nitrogen gas was included in the chamber.

The data of FIG. 3 was obtained by sweeping the voltage on the analyzed sector plates, the charge and energy distribution data for boron as shown in FIG. 2 was integrated to produce FIG. 3A. FIG. 3 also shows data for equivalent experimental conditions where a deposition chamber included nitrogen gas backfill of 0.8 m Torr (FIG. 3B). There are 3 sets of data in FIGS. 3A and 3B, respectively, showing B(11), B(10) and N (nitrogen). The nitrogen curves are significantly smaller in amplitude than the boron curves due to the depletion of N in the BN target from heating and ablation over time.

FIG. 3A shows the ion energy distributions resulting from successive spectra as obtained per FIG. 2. In FIG. 3A the peak of the +1 ion energy distribution is to the extreme left followed by +2, +3, +4, and +5. B(11) is the top plot and B(10) the middle plot. Peaks from nitrogen are also given as the bottom plot of FIG. 3A, but are not being used to demonstrate the effect in this figure. It is anticipated that the very small concentrations of nitrogen isotopes, not desirable here, are likewise undergoing enrichment. These nitrogen peaks exist because the starting material is boron nitride and nitrogen ions were generated as well as boron ions. More specifically, FIG. 3A shows a plot of transverse ion density expressed in ions/cm$^2$ versus ion energy expressed in keV. FIG. 3A was obtained by sweeping the sector voltages on the analyzer plates resulting in the energy distributions as a function of the charge state. As can be seen from FIG. 3A, the geometry of the experiment of FIG. 1, caused capture and detection of the zone within the laser ablation plumes where the relative ratio of these isotopes (B(10) and B(11)) are drastically altered from their naturally occurring abundance, when measured as a function of charge state and energy. That is, in all cases, the ratio of B(10):B(11) was greater than that which naturally occurs, and often close to 50:50.

The results demonstrated in FIGS. 2 and 3A were also obtained when generating a plume in the deposition chamber in the presence of a background gas of nitrogen. When the chamber contained nitrogen gas, there was a charge exchange which occurred as the boron ions gathered electrons from the nitrogen. Here, the boron ions were reduced from the higher charge states such as +3, +4 and +5 and to the lower charge states, namely, +1 and +2. This is evident from FIG. 3B. Here, enhancement was also clearly obtainable since the ratio of B(10) to B(11) was on the order of 50:50.

It is thought that the presence of the background gas facilitates formation of a product film containing constituents derived from the background gas and this may be desirable in forming isotope enriched zones having a particular chemical composition. It is clearly advantageous that the presence of a background constituent does not affect the process of enrichment yet permits inclusion of background gas species in a product. Therefore, by this means, materials of desired composition may be formed having the isotope enriched feature. This is demonstrated later with respect to formation of a film from the plume. It is anticipated that isotopically enriched particulates, precipitated from the plume or background gas, could also be formed. This would provide a mechanism for creating isotopically enriched nano-particles.

FIG. 4 contains results obtained from the experimental apparatus of FIG. 1 but with a different laser beam. Here, laser wavelength of 1.06 microns was used; repetition rate of 10 Hz was used; and a pulse width of 6 nanoseconds was used. The pulse energy was 60 millijoules (mJ) energy per pulse corresponding to a fluence of 760 J/cm and an intensity of $1.3 \times 10^{11}$ w/cm$^2$. Here, the main difference in the method was the use of significantly different pulse width, namely, 6 nanoseconds as compared to the prior 200 femtoseconds. The experiment was conducted both in a vacuum and in the presence of nitrogen background gas.

The experimental set up used to obtain data of FIG. 4 included the directing of the plume through an aperture as shown in FIG. 1. Therefore, the data of FIG. 4 also shows capture and detection of the B(10) enriched central portion (cone) of the plume.

Figure 4A:
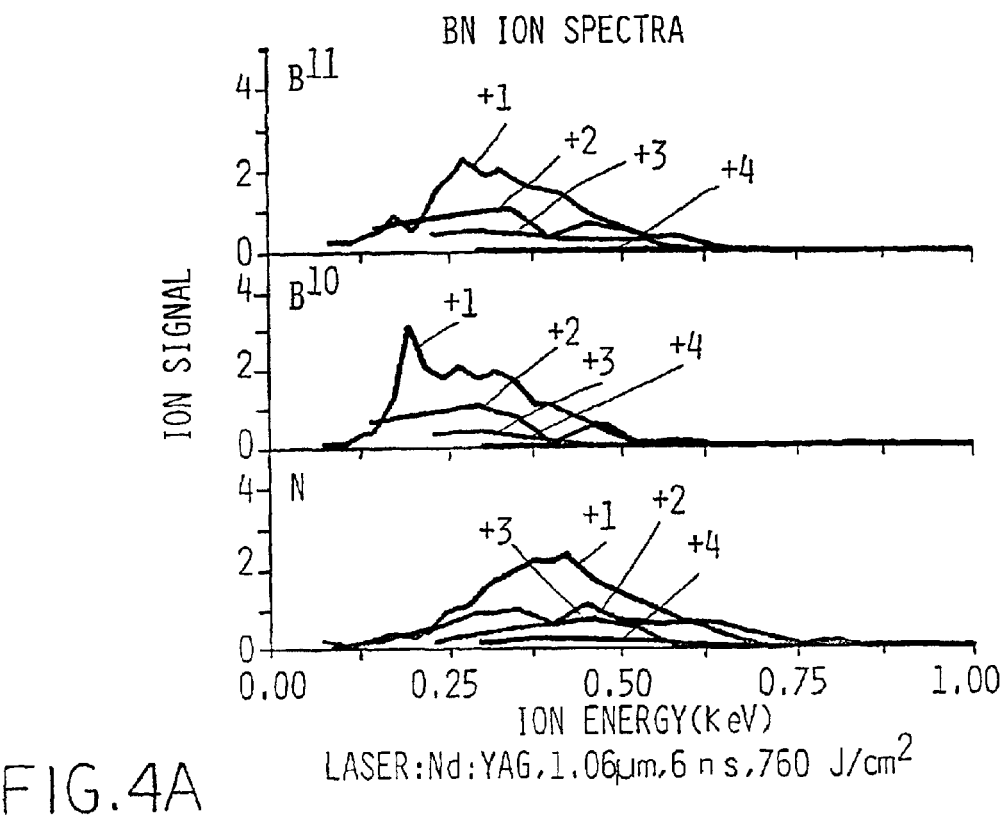
FIG. 4 contains two plots labeled as 4A and 4B. The data of FIG. 4 was obtained by ablation of boron nitride target at 6 nanoseconds pulse width, 1.06 micron wavelength, 60 millijoule energy per pulse, corresponding to an energy fluence of 760 $J/cm^2$ based on 100 micron spot size.
Figure 4B:
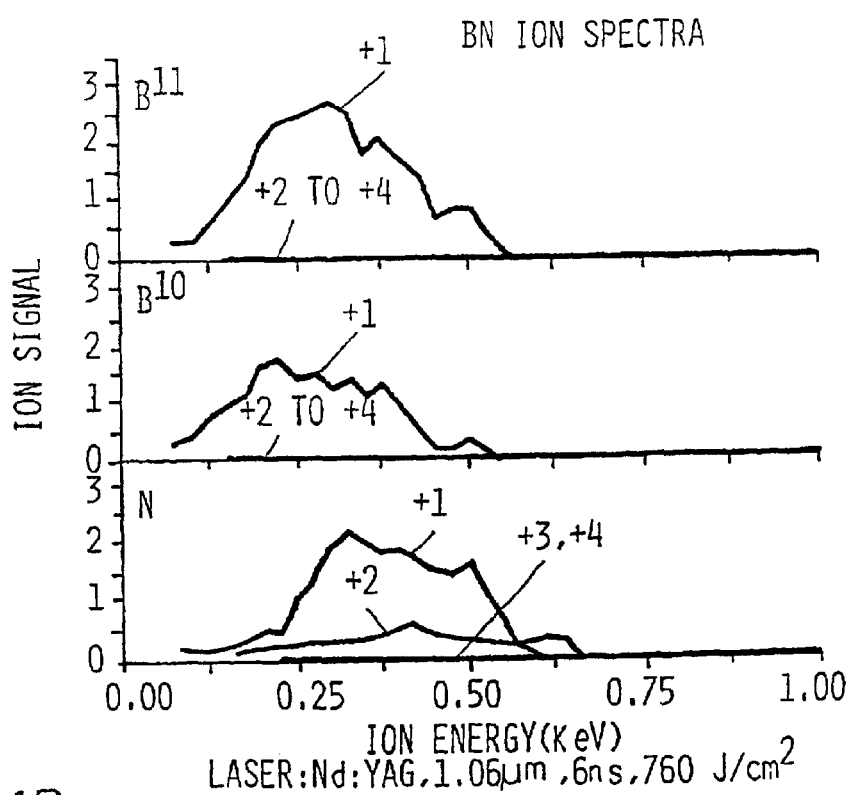

FIG. 4 shows transverse ion density of the plume captured in the enriched zone as a function of energy level. The results shown in FIG. 4 are both for the case of the vacuum and the case where nitrogen background gas is contained in the deposition chamber. It is observed that generally the transverse boron ion density in the 6 nanosecond case is less than the 200 femtosecond case. In other words, there is less dense plasma plume generated under the laser operating parameters defined here at 6 nanoseconds pulse width. Relative enrichment is still obtainable. In other words, there is enrichment of B(10) with respect to B(11) as compared to that which is naturally occurring. The overwhelming conclusion to be drawn from the data is that enrichment has clearly occurred. The effect of $N_2$ background gas in FIG. 4B was similar to that observed in FIG. 3B. Therefore, the overall conclusion to be drawn from the data presented in FIGS. 2, 3, and 4 is that the relative ratio of the isotopes, in these ablation plumes, are drastically different from that observed for the naturally occurring species as reported in standard references. More specifically, the experimental set-up shown in FIG. 1 contains the apertures having four millimeter (mm) holes. The aperture guided the plume into the detector and also acted as a way of isolating the high pressure zone of the chamber from the low pressure (vacuum) zone. Since the plume was generated in a vacuum chamber, apertures help in maintaining the relative vacuum. As a consequence of this set-up, the aperture essentially permitted passage through of that portion of the plume which contained the relatively high proportion of B(10) as compared to B(11). Therefore, all of the data shown in FIGS. 2, 3, and 4 show a relatively enriched B(10) portion of the plume.

Figure 5A:
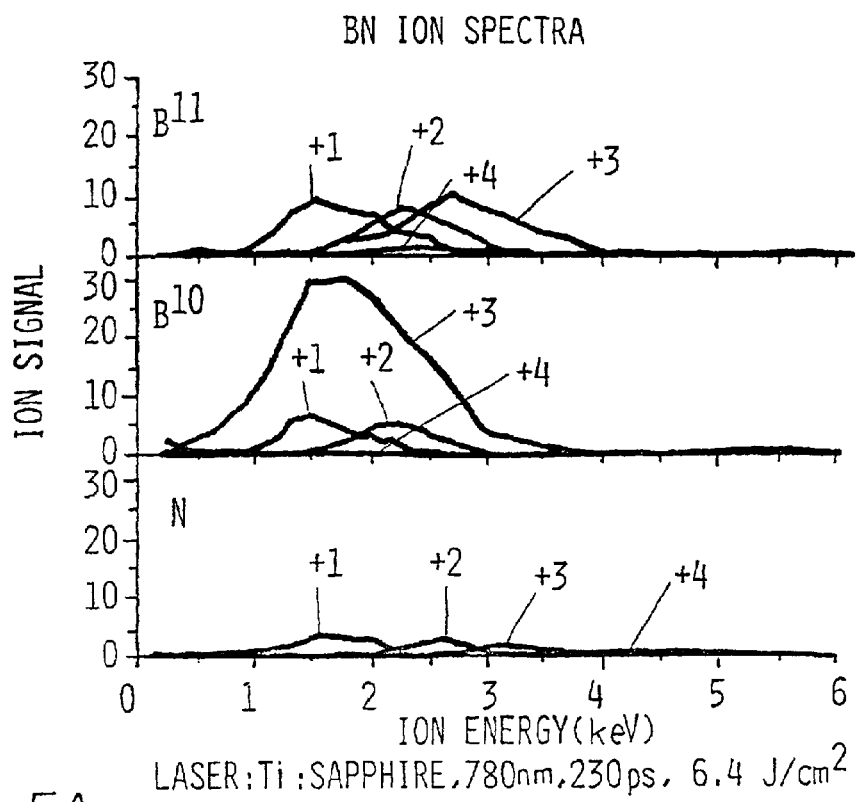
FIG. 5 contains two plots labeled as 5A and 5B. The data of FIG. 5 was obtained by ablation of boron nitride target at 230 picoseconds pulse width, 780 nanometers wavelength and 6.4 J/cm² energy fluence.
Figure 5B:
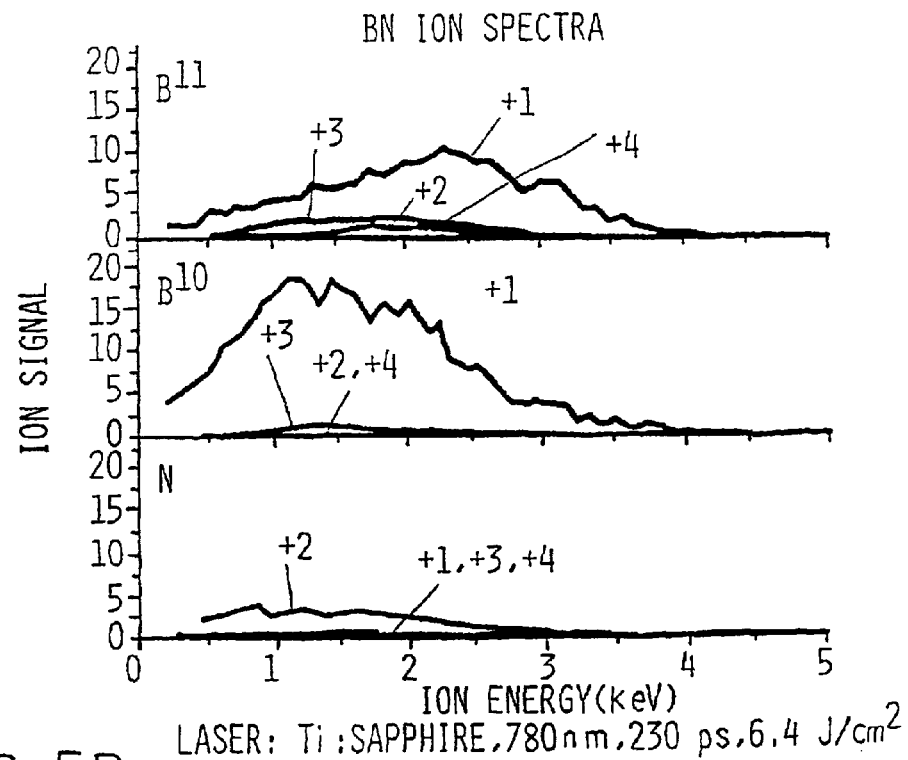

FIGS. 5A and 5B show the isotope enhancement effect for a picosecond laser pulse. The energy and charge state distribution of the ions are shown from a BN plume. The plume was generated with a 780 nanometer, 230 picosecond laser pulse with an intensity of $2.8 \times 10^{10}$ Watts/cm$^2$. FIG. 5A is for a plume in vacuum, and FIG. 5B is for the same plume in a background of 0.8 milliTorr of N2 gas. Charge state +3 in the vacuum case and charge state +1 in the N2 case show a very strong enhancement of B(10) over B(11). This demonstrates the dependence of the isotope effect on ion charge state and ion energy.

Figure 6A:
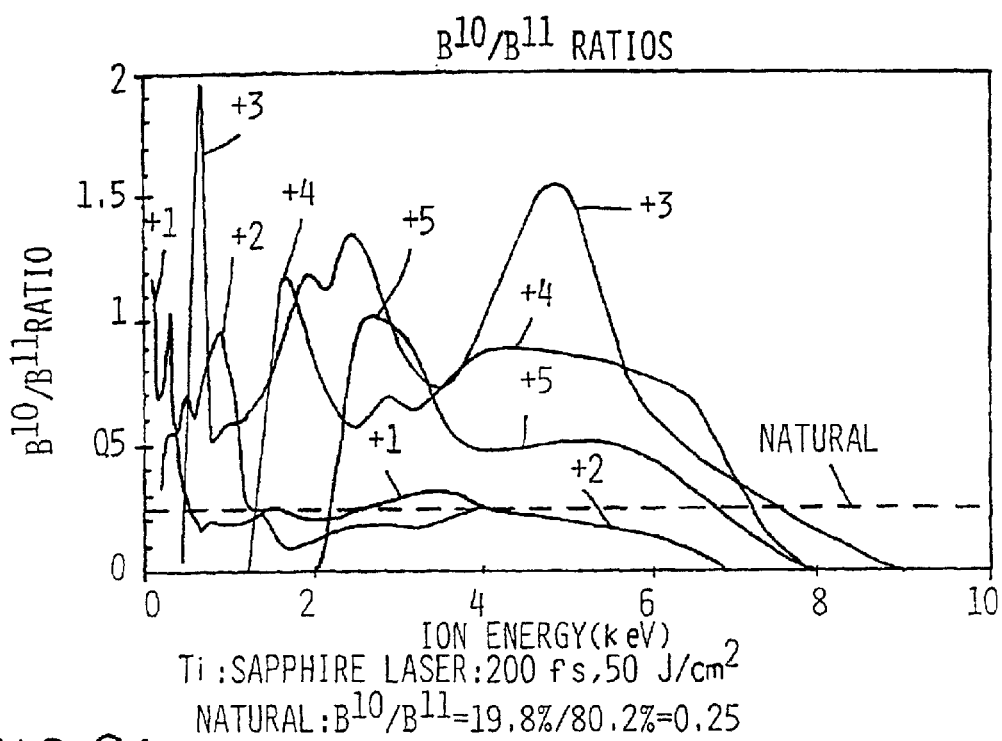
FIG. 6 shows plots of the ratio of $B^{10}/B^{11}$ for the data as respectively shown in FIGS. 6A (femtosecond case as per 3A), 6B (picosecond case as per 5A) and 6C (nanosecond case as per 4A).
Figure 6B:
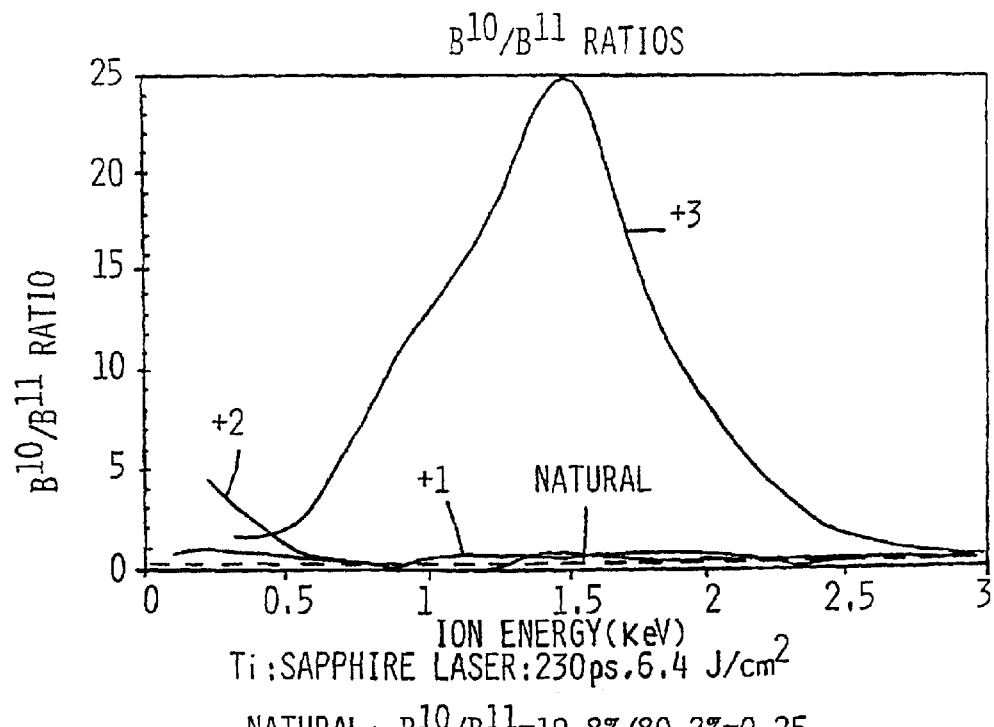
Figure 6C:
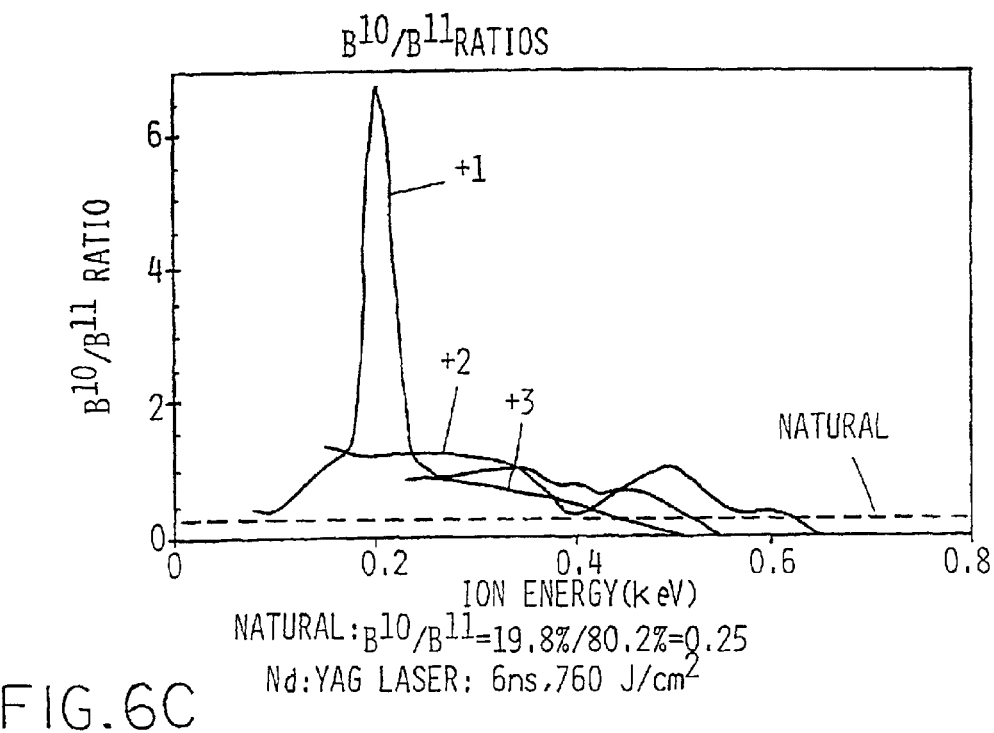

The dependence of the isotope enhancement on ion charge state, ion energy and laser pulse duration is summarized in FIG. 6. The calculation of the B(10) to B(11) ratio for the data from FIGS. 3A, 5A, and 4A is shown in FIGS. 6A–C, respectively. The naturally occurring ratio is 0.25 and is shown as the dotted line in each graph. The femtosecond case in FIG. 6A shows a strong enhancement of B(10) over B(11) for charge states +1 to +5, particularly for +3, +4, and +5. The enhancement is present for nearly the entire range of the ion energies.

Figure 7:
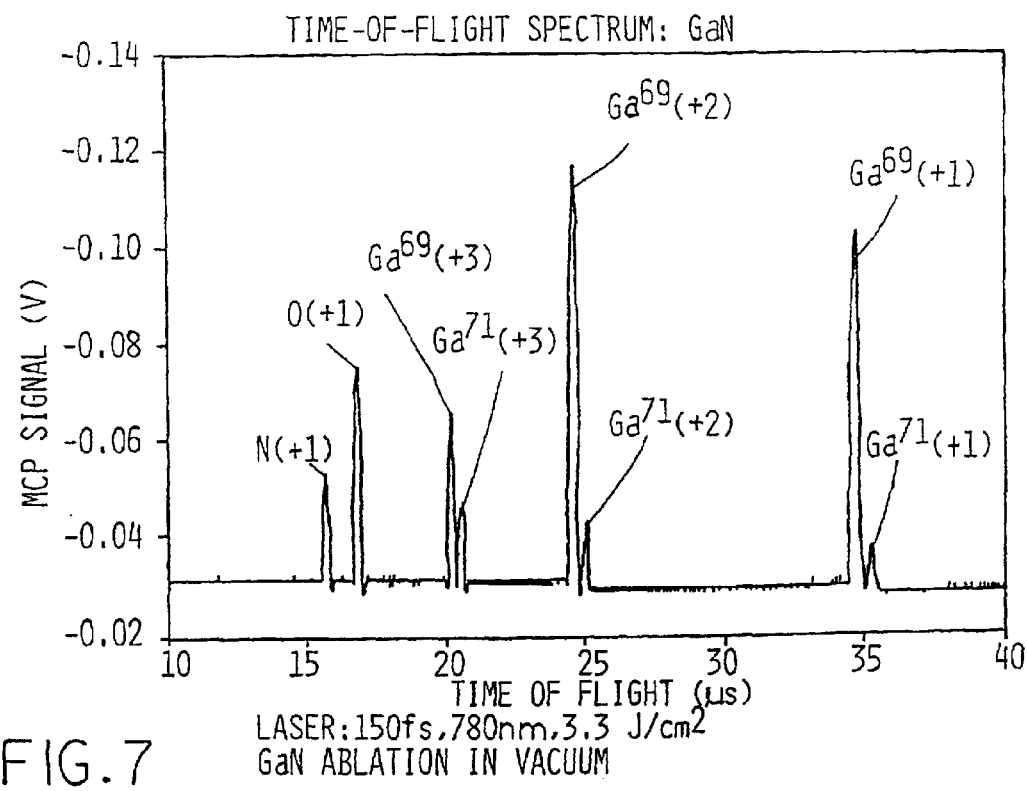
FIG. 7 is a graph showing the signal from the microchannel plate (MCP) of the ion energy analyzer in units of voltage as a function of arrival time after the laser pulse in microseconds.

The isotope enhancement was also measured for gallium which has naturally-occurring isotopes with masses of 69 and 71 amu with an abundance of 60.4% Ga69 and 39.6% Ga71. Enrichment of the lighter isotope was also observed for this material using the experimental set-up of FIG. 1 in the same manner as for boron nitride. The time-of-flight spectrum from a GaN (gallium nitride) ablation plume in vacuum is shown in FIG. 7. The laser pulse was 150 femtoseconds, 780 nanometers, and $2.2 \times 10^{13}$ Watts/cm$^2$. In charge states +1 to +3, Ga69 and Ga71 are present, with ratios clearly greater than the naturally-occurring ratio of 1.53.

Figure 8A:
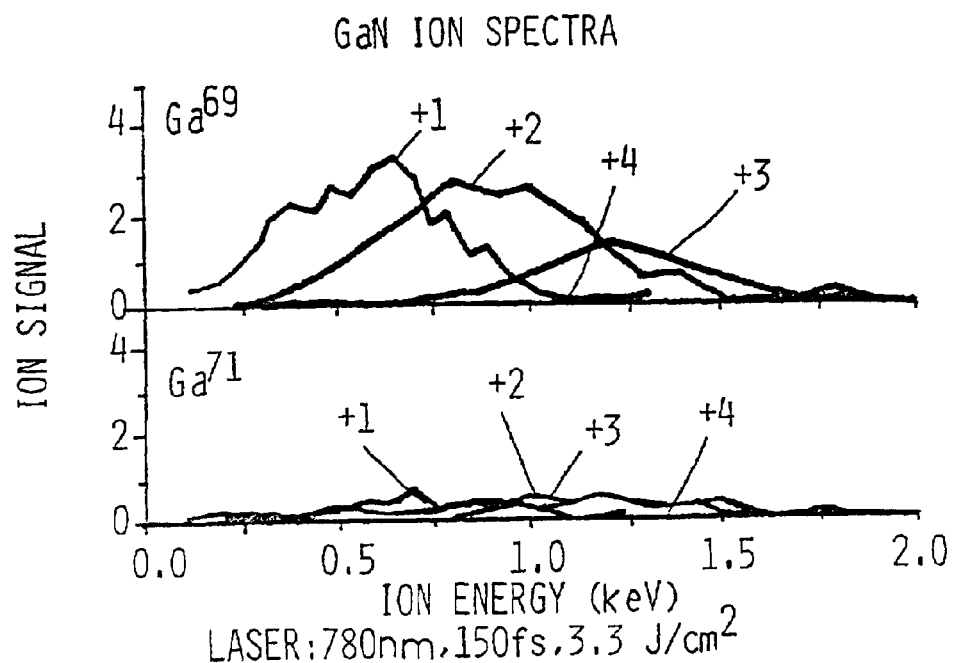
FIG. 8A shows data obtained in the experimental apparatus of FIG. 1 where the deposition chamber was under vacuum.
Figure 8B:
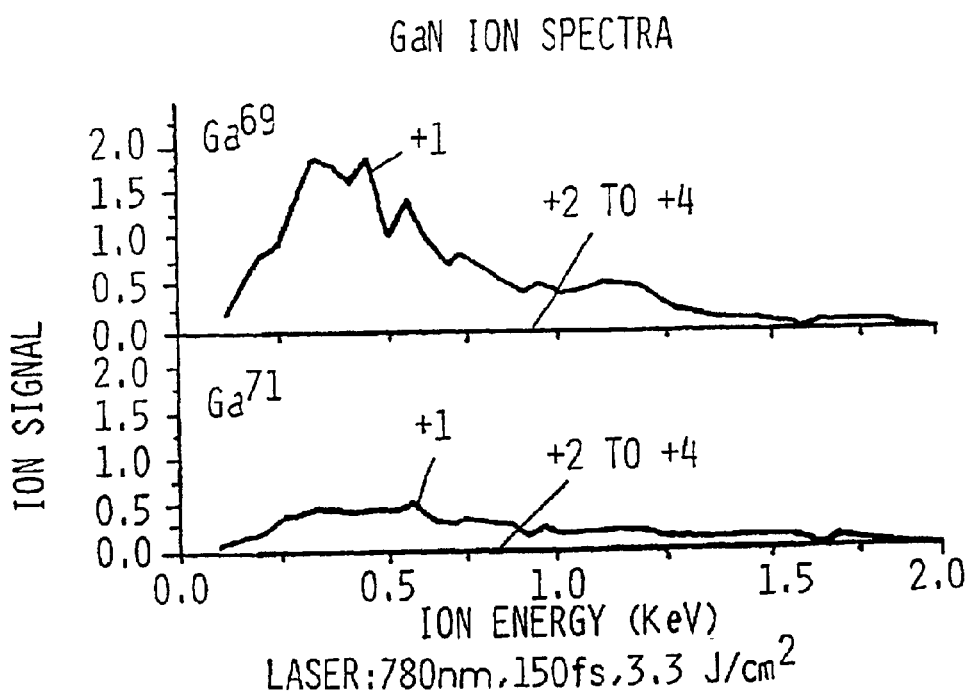
FIG. 8B shows data obtained in the same experimental configuration and under the same conditions except that nitrogen gas was included in the chamber.

The time-of-flight spectra are compiled in FIG. 8 for the same laser pulse described for FIG. 7. FIG. 8A shows the ion charge state and energy distribution in vacuum and FIG. 8B shows the case in 0.8 milliTorr N2 background gas. Once again, the enhancement of the lighter isotope, Ga69, over the heavier, Ga71, above the naturally-occurring abundance is clear for the different charge states and energies.

Figure 9A:
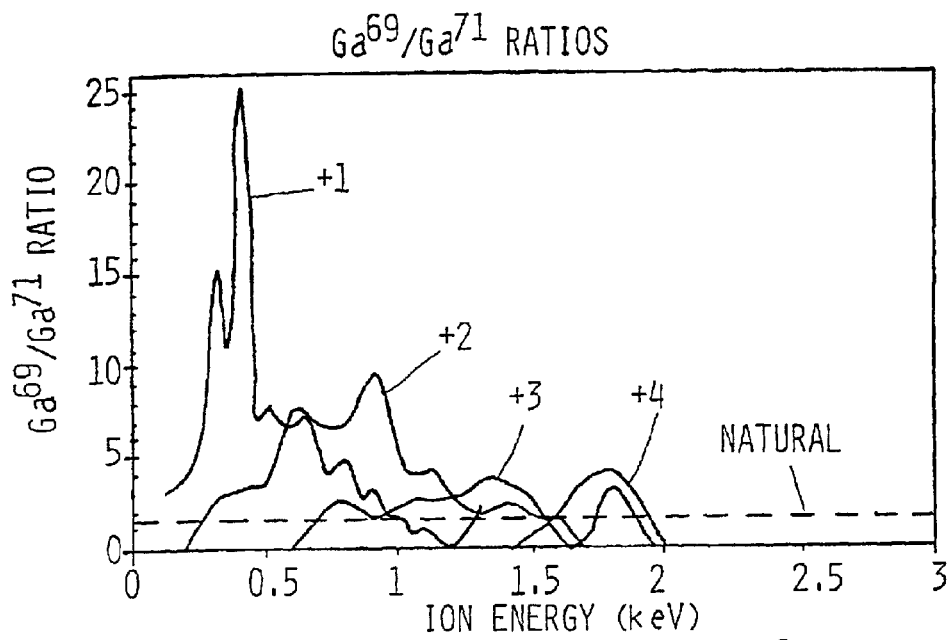
FIGS. 9A and 9B are at 150 femtoseconds, 3.3 J/cm² in vacuum and vacuum plus background nitrogen, respectively.
Figure 9B:
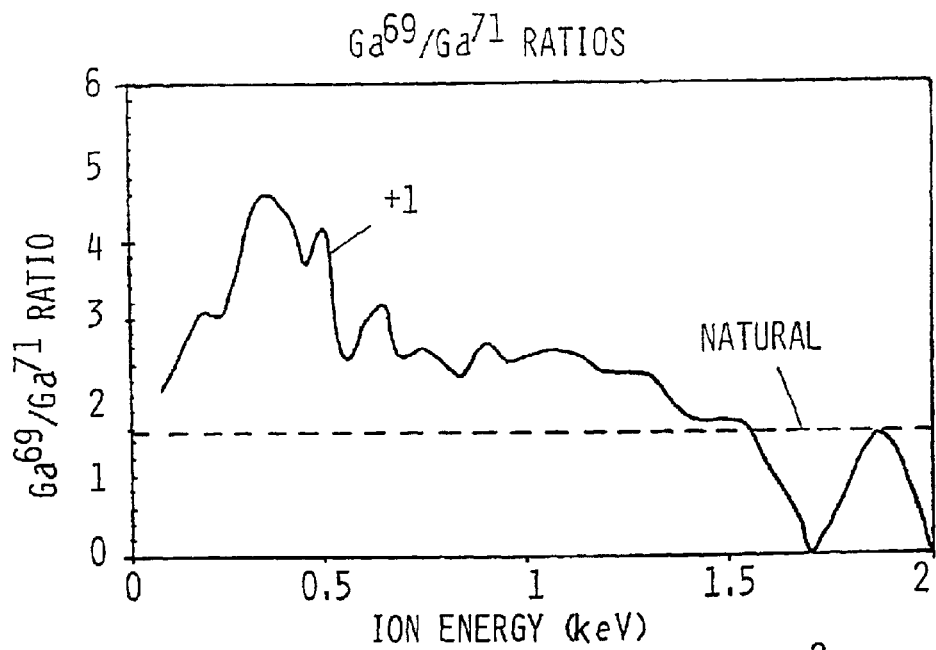
Figure 9C:
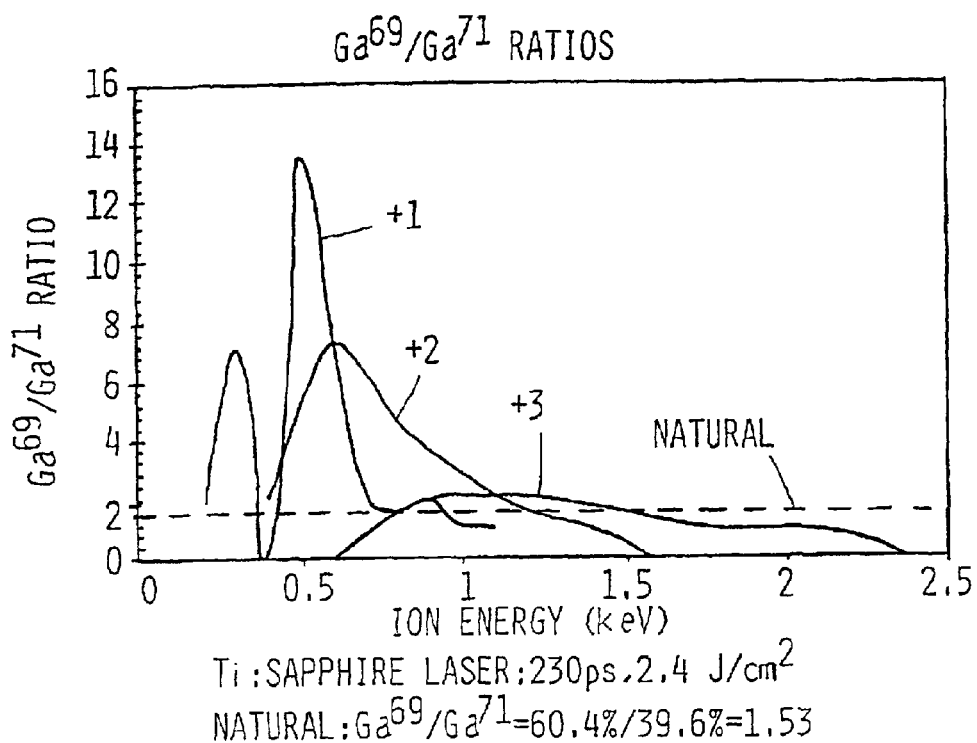
FIG. 9C is for vacuum at 230 picoseconds, 2.4 J/cm².

The isotope ratio for gallium is shown in FIG. 9 for three conditions. FIGS. 9A and 9B are for 150 femtosecond, 780 nanometer, 3.3 Joules/cm$^2$ laser ablation plumes. FIG. 9A shows the calculated Ga69 to Ga71 ratio for the plume in vacuum, and FIG. 9B in a background gas of 0.8 milliTorr N2. FIG. 9C shows the ratio for a 230 picosecond, 780 nanometer, 2.4 Joules/cm$^2$ laser ablation plume in vacuum. The naturally occurring ratio 1.53 is shown as dotted lines in the figures. The enhancement of the lighter isotope, Ga69, over the heavier one, Ga71, follows the same trend as the boron case for B(10) and B(11). The effect is generally stronger here for gallium than that shown for boron in FIGS. 3–5.

Figure 10:
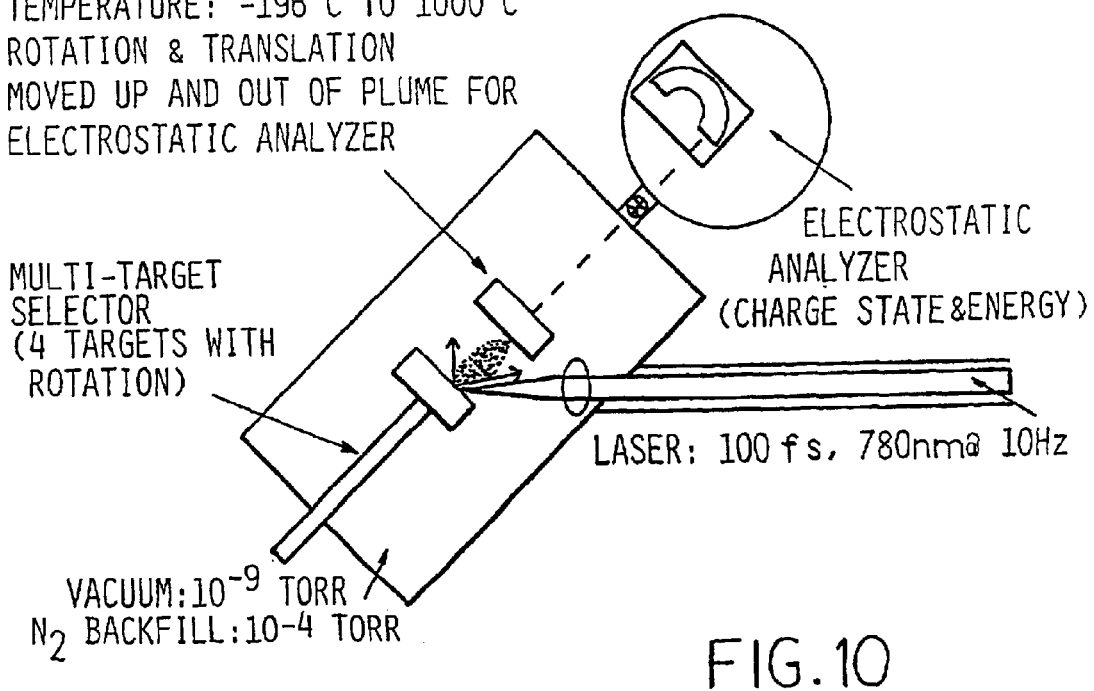
FIG. 10 is a schematic of a system for depositing a thin film from the ablation plume, containing activated, neutral, and ionized particles, onto a substrate. The configuration of FIG. 10 is similar to that of FIG. 1 except in FIG. 10 the aperture to the detector is blocked by the deposition substrate. As shown in the schematic, a laser beam from an external laser source enters the deposition chamber and impinges on a target, generates a plume, and the plume is deposited on a substrate holder.
Figure 11:
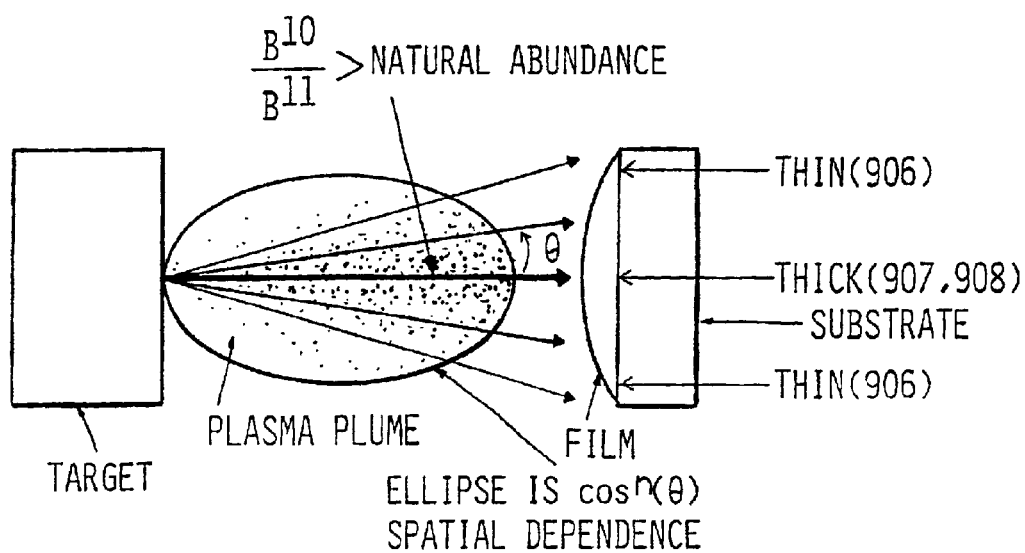
FIG. 11 shows a schematic illustration of a plume being emitted from a target and captured on a substrate. The figure shows that the plume has a $Cos^n(\theta)$ spatial distribution with the largest concentration directed normal to the target surface and a decreasing concentration away from normal. In the expression $Cos^n(\theta)$, θ is zero along the normal direction. The n represents a power function factor and theta represents the angle measured from the direction normal to the surface. With such a distribution, the plume deposits a graded concentration of material consisting of a thick portion of deposition on the central part of the substrate and a relatively thinner zone of deposition on outer (high θ) regions of the substrate.

The effect observed in the time of flight ablation plume coming from the ablated target is useful for preparing film products. This is accomplished by directing the plume toward a substrate in an experimental arrangement as shown in FIG. 10. As shown schematically in FIG. 11, the plume condenses to form a thin film on the surface of the substrate. The film was enriched in the preferential isotope ratios as observed earlier and as demonstrated by FIGS. 2–6. The following film experiments were designed to capture essentially the entire cross section of the plume. By this means, zones rich and lean in B(10) as compared to the natural abundance were clearly observed and verified. More specifically, it is believed that isotopes are neither created nor destroyed in the process, therefore, it is assumed that the composition of the plume or remaining affected target material, in total, represent natural occurrence of the B(10) and B(11) isotopes. This is further illustrated by reference to FIG. 11. FIG. 11 is a schematic showing the plume coming off of the target. The plume has a relatively B(10) enriched conical section (zone) and a relatively lesser B(10) zone on either side of the concentrated zone. These lesser concentration zones maybe B(11) depleted. In order to further understand and verify the relative proportions of the isotopes in the entirety of the plume, films were formed in the deposition chamber in a manner which captured essentially the entire cross-section of the plume. This entire cross-section encompassed a relatively B(10)-rich central conical section as well as surrounding zones having relatively less B(10) or being B(10) depleted.

Film Production and Analysis

FIG. 10 shows an experimental set-up very much similar to the experimental set-up of FIG. 1 except that the plume generated from the target is directed to a substrate to form a film thereon. No apertures are used to screen out any portion of the plume or film. As shown in FIG. 10, the laser generates a pulse of 150–200 femtoseconds, 780 nanometers, and 10 Hz with an energy per pulse of 4 mJ–100 mJ. The laser beams are directed through a focusing device onto the target. In this example, the target is boron nitride. A plume of laser plasma is generated containing ionized particles of boron, nitrogen, and also electrons, some neutrals, and likely some excited atoms and molecules. The plume is directed onto a 2-inch diameter silicon substrate where the film is formed. Optionally, the substrate holder may be cooled by liquid nitrogen to a temperature on the order of 77° K. if desired to affect the condensation and morphology of the formed film. Substrate temperatures elevated above room temperature are also possible up to 1000° C. The electrostatic analyzer (charge state and energy analyzer) is also shown.

The silicon substrate had a thickness on the order of 400 microns and boron nitride films were deposited thereon having a thickness of approximately 0.1 microns. Once the system had been set-up, aligned and calibrated, films were produced from the plasma in a relatively short time frame on the order of about 15 minutes.

Figure 12:
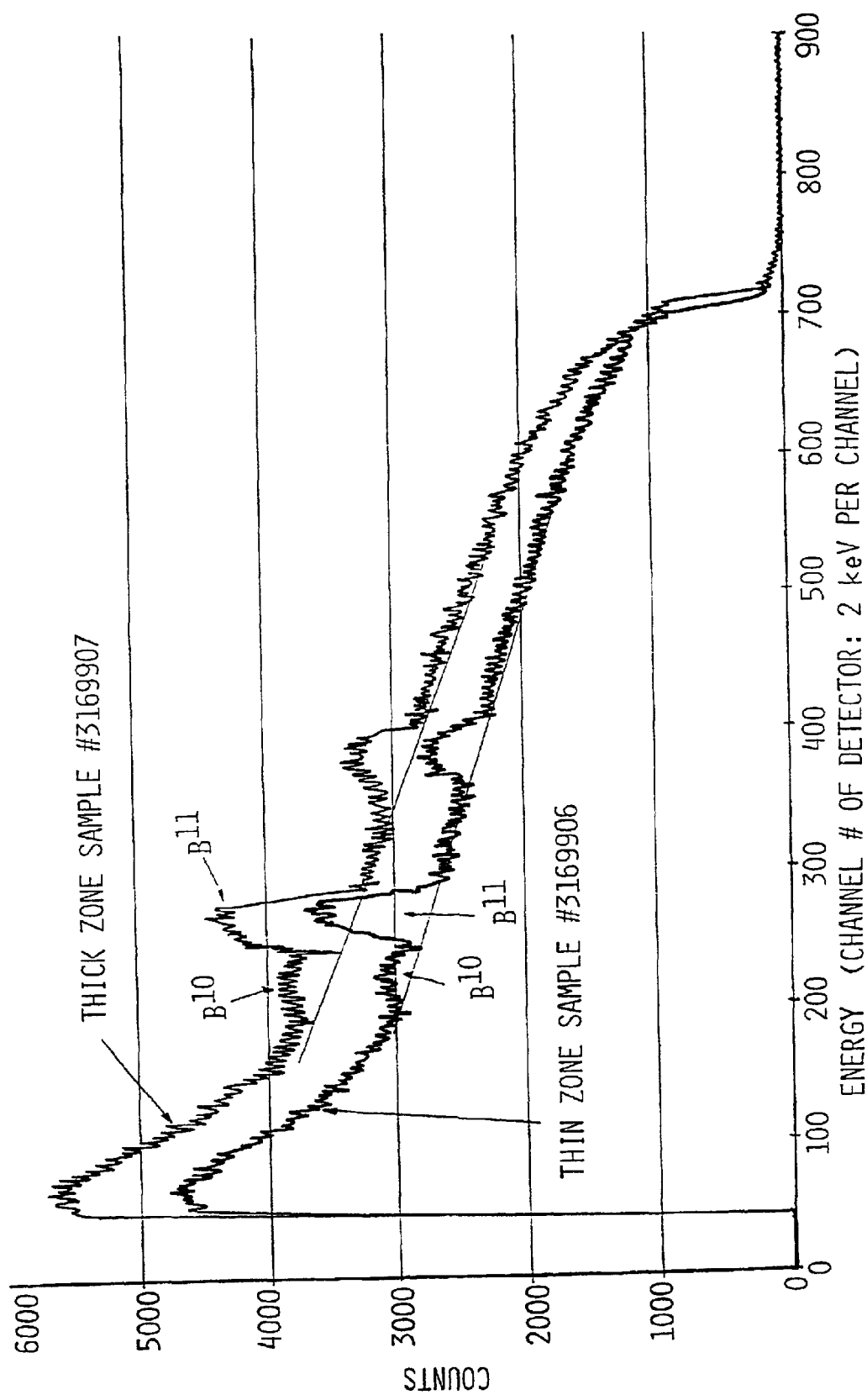
FIG. 12 shows the Rutherford backscattering spectra of a deposition process conducted in accordance with the experimental system shown in FIG. 10.
Figure 13:
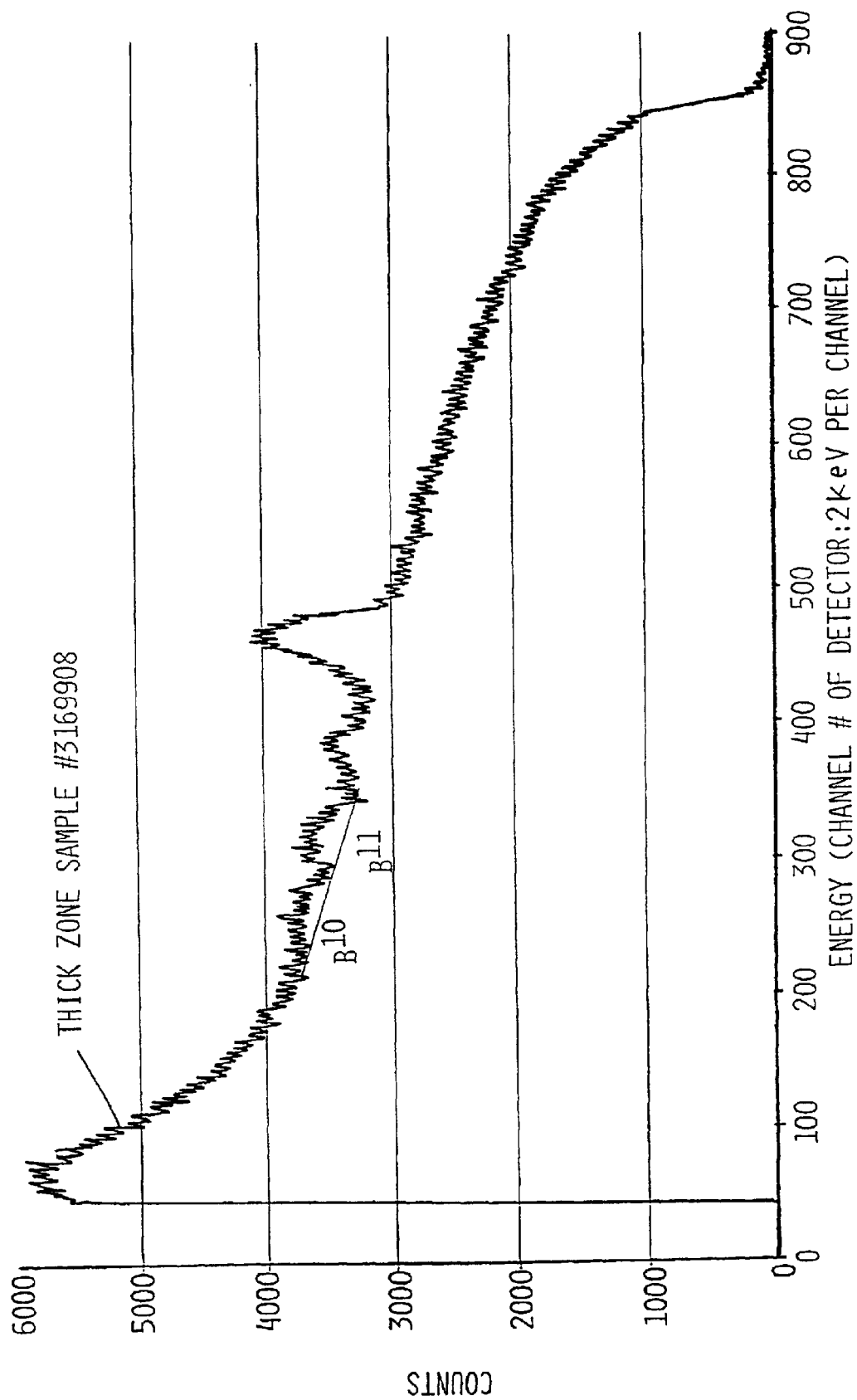
FIG. 13 shows the Rutherford backscattering spectrum of a deposition process conducted in accordance with the experimental system shown in FIG. 10.

The results of the deposition process are shown in Table I and corresponding graphs of FIGS. 12 and 13. Table I contains as a first entry, a listing of the relative abundance in nature of B(11) and B(10). The natural occurring ratio of B(11):B(10) is about 4:1. The data entry designated as BN3169906 (−906) was taken from a relatively thin zone of the film. As shown in FIG. 11, the film thickness decreases from the center toward the outer edge of the substrate. An analysis of this thin part of the film, based on Rutherford ion beam analysis, shows the counts for B(10) and B(11). The ratio of B(11) to B(10) at the −906 data point is relatively rich in B(11) (i.e., depleted in B(10)). Here, the amount of B(10) is on the order of 17% whereas its naturally occurring amount is close to 20%. The amount of B(11) in the −906 sample is close to 82%, whereas its naturally occurring amount is about 80%.

Samples 3169907 (−907) and 3169908 (−908) were taken from portions of the film designated as thick and near the center of the substrate. This is also schematically shown in FIG. 11. In the −907 sample, B(10) was on the order of 30% and B(11) on the order of 70%. Here it is clearly seen that the amount of B(10) isotope present in this zone of the film is very much greater than the naturally occurring amount which is about 20%. Sample −908 (FIG. 13) confirms the results found in sample −907. In sample −908, isotope B(10) was present in an amount close to 35% based on the sample count of B(10) by the Rutherford scattering method, and B(11) count was on the order of 65%. Here it can be seen that the amount of B(10) is very highly enriched as compared to its naturally occurring amount with respect to B(11). Referring back to curve 6 of FIG. 12, (sample −906 taken from the thin portion of the film) it is possible to subtract out the effect of the silicon substrate by virtue of the line, and look above the line for the peak in the vicinity of channel 200 which shows B(10) in a relatively small proportion for curve 6. The proportion of B(10) in the thick portion of the film is the upper curve labeled curve 7. Here the proportion of B(10) is greater than that which naturally occurs. B(11) peak is shown closer to the channel 300 on the curves. Overall, it can be seen that the proportion of B(11) to B(10) in curve 6 is higher than the proportion of B(11) to B(10) in curve 7.

FIG. 13 contains results corresponding to sample −908. Sample −908 was taken near the relatively thick center of the film. B(10) is shown as a peak in the vicinity of channel 200 and B(11) is shown in the vicinity of channel 300. Here the proportion of B(10) is higher than either of the samples −907 or −906. It should be noted that the peak near the channel 400 of the X axis of all the curves corresponds to nitrogen. In all cases, the baseline represents the silicon substrate.

Figure 14A:
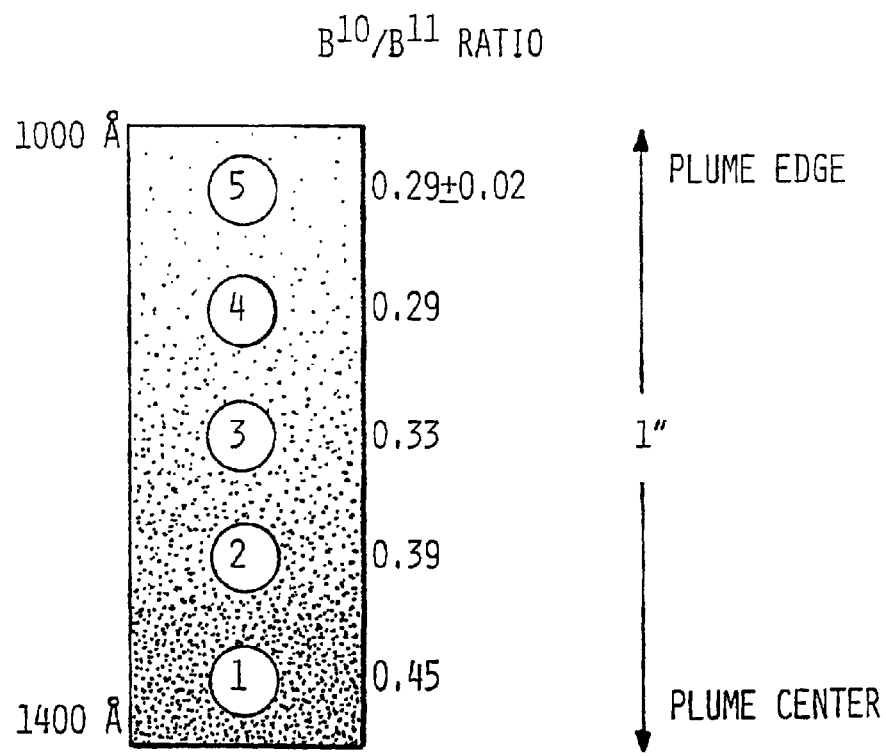
FIG. 14A shows 5 sampling spots of the film taken at separate areas over a 1" region of the film. Sample 1 is at the thickest region (plume center) and samples 2–5 are at progressively thinner regions away from the center. The ratio of $B^{10}/B^{11}$ decreases from sample 1 (at $B^{10}/B^{11}$ of 0.45) to sample 5 (at $B^{10}/B^{11}$ of 0.29). Sample 5 (thinnest region) has $B^{10}/B^{11}$ ratio closest to that which naturally occurs (0.25).
Figure 14B:
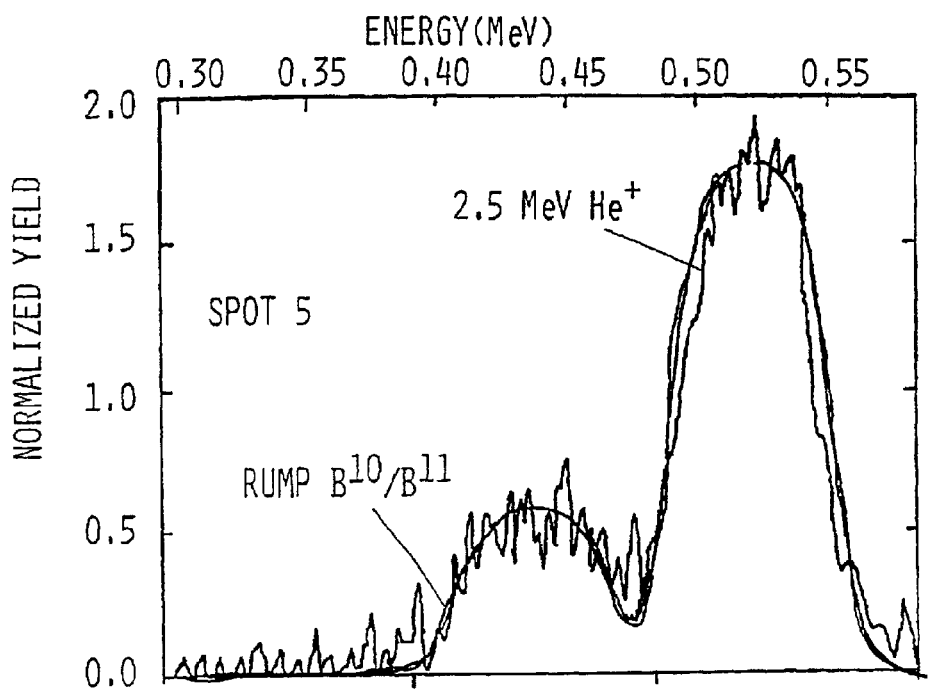
FIG. 14B is for spot 5 (thin) and FIG. 14C is for spot 1 (thick). Note that the vertical scales in 14B and 14C are different.
Figure 14C:
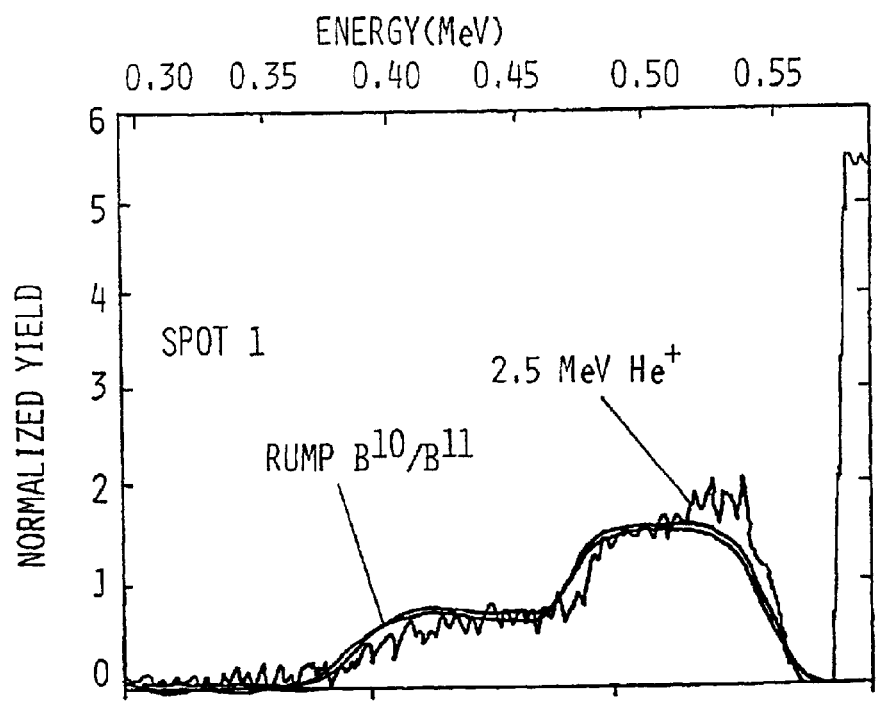
Figure 15A:
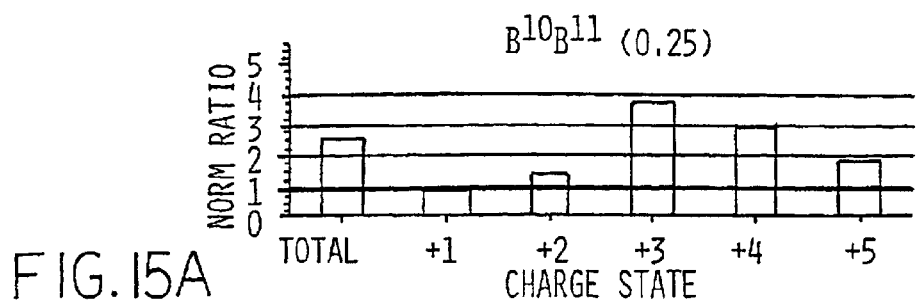
FIG. 15 shows isotope ratios, normalized to the natural abundance ratio (shown in parenthesis) for boron (15a), zinc (15b), titanium (15c), gallium (15d), and copper (15e) as a function of charge state. Ablation plumes were generated from solid targets with 780 nm, 200 fs, $2\times10^{14}$ W/cm² laser pulses, to produce results as shown in FIG. 15, parts (a) to (e).
Figure 15B:
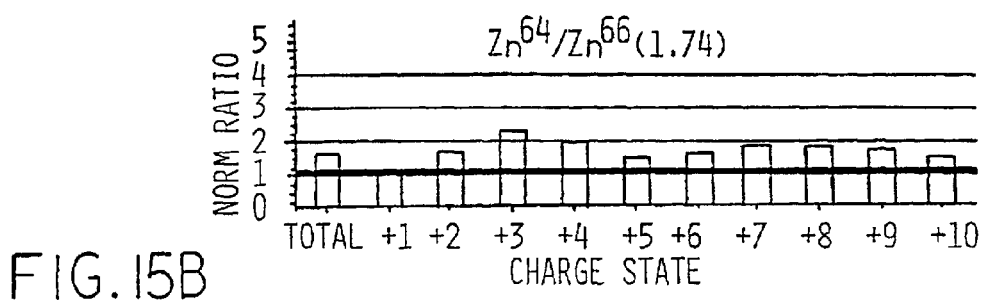
Figure 15C:
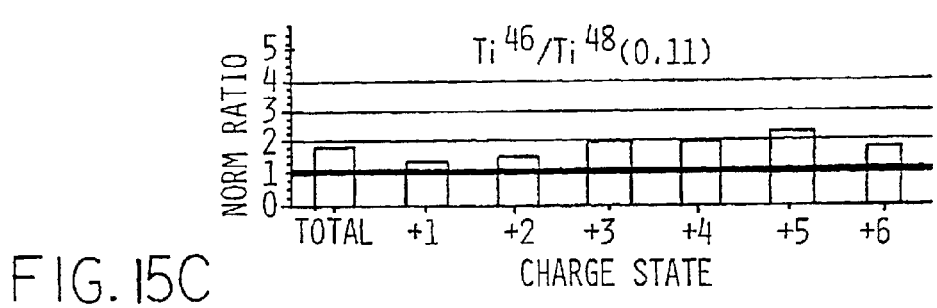
Figure 15D:
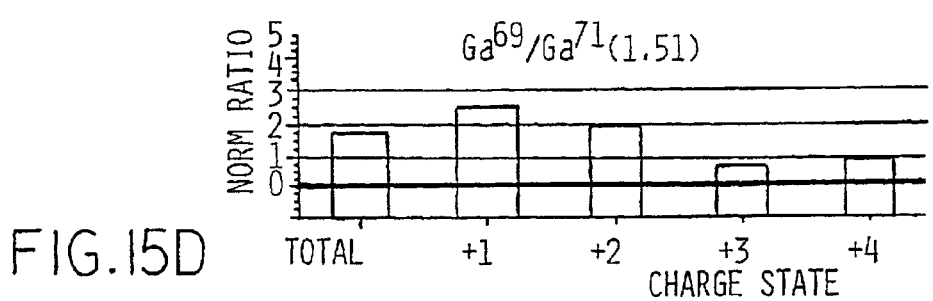
Figure 15E:
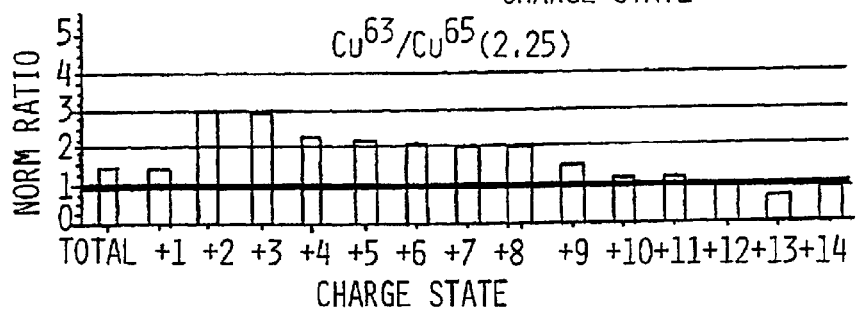

The BN film was analyzed by Rutherford backscattering (RBS) at 5 spots of 3 mm size over a range of 1", as shown in FIG. 14A. The RBS spectrum was fit using the commercially-available computer program RUMP. The silicon background was subtracted out and the B(10) to B(11) ratio was fit as shown in FIGS. 14B and 14C for different spots on the film. The thickest region of the film was sampled at spot (1) which corresponds to the deposition from the central part of the plume. The thinnest region of the film was sampled at spot (5) which corresponds to the outer part of the plume. The B(10)/B(11) ratio is maximum for the film captured from the plume center and decreases toward the naturally-occurring ratio away from the center.

The experimental set-up of FIG. 1 was used in further experiments, using the method applied to boron and gallium. The method applied to boron and gallium produced measured factors greater than 2 for isotopic enrichment in the multiple-charge-state ions from ultrafast laser ablation plasmas. Such methods applied to the elements Zn, Ti, and Cu produced results which confirm the enrichment of the lighter isotope on the target-normal axis of the expanding ablation plume (see FIG. 15). Angular scans of these plumes for boron demonstrated the persistence of the enrichment effect to wide angle, being present as far out as 45 degrees from the normal direction (central axis). Systematic variations in the dominant ion species and their energy distributions, as a function of charge state, are observed in these angular scans (see for example FIG. 16).

Deposition of isotopically-enriched thin films appear to be strongly influenced by the ratio of ionic to neutral-atom species in the plasma. The data here demonstrate a relationship between the ion to neutral atom ratios in the plumes and the laser operating parameters. A variety of techniques were employed to show such ratios as a function of laser operating parameters, including deflected versus non-deflected neutral species in the ion energy analyzer, laser probe deflection in the refractive portion of the ablation plasma, emission spectroscopy, and Langmuir probe measurements. In general, the neutral species were observed to have several factors of 10 lower energies than the ions. Likewise, the data indicates that laser operating parameters are used and adjusted to maximize or minimize the ionic to neutral specie ratios in the plume. It is thought that secondary laser pulses which act as plasma pumping pulses could significantly change the ion to neutron ratio and thereby provide greater enrichment.

Figure 16:
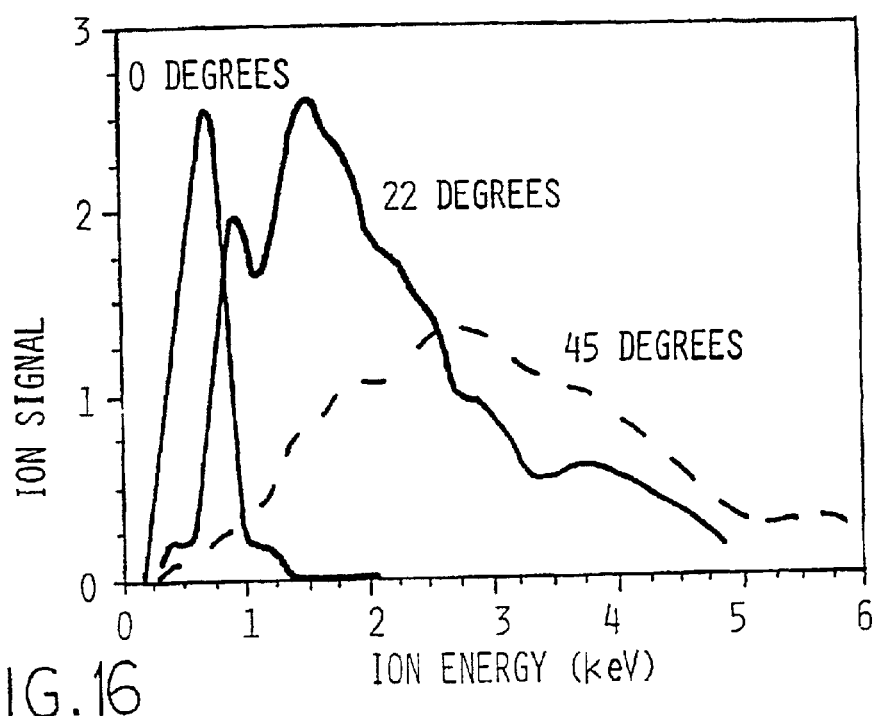
FIG. 16 shows angular dependence of boron 11 charge state +3 energy distribution for ablation of a solid target with 780 nm, 60 fs, $5\times10^{14}$ W/cm² laser pulses. Angles are measured with respect to the target normal.

FIG. 15 shows the isotopic ratios of several elements from the periodic table, as a function of charge state, as observed in ultrafast laser ablation plasmas. In FIG. 16 are the results of an angular scan showing the variation in energy distribution, as a function of angle from normal for moderate-intensity ablation ($5 \times 10^{14}$ W/cm$^2$). These results are consistent with the model of a plasma centrifuge for separation of ions according to kinetic energy. This plasma centrifuge is thought to be controlled by the longitudinal magnetic field of the laser ablation plasma. It is thought that the expanding plasma produces a strong magnetic field that provides a rotational component to the ions as they explode (expand) away from the ablating surface.

These results demonstrate a kinetic energy separation for the ion energy distributions as a function of observation angle relative to the target normal. Such kinetic energies are proportional to the first power of the mass and second power in velocity (K.E.=½ mv$^2$), thus confirming the presence of lower mass ions (with lower velocity) near the zero (or central) axis.

The results shown in FIGS. 15 and 16 for the various elements are consistent with the results obtained for boron. Returning to the data for boron, Table II shows the integrated areas under each of the charge-state curves presented in FIG. 3. The ratios of these areas are also presented which provides a measure of the total isotope enrichment associated with each charge state of boron. An interesting pattern is seen in the case of vacuum ablation where charge state +3 has the largest (nearly 1:1) ratio of the light to heavy isotope. This is followed by charge state +4 which has the next most highly-enriched condition. It is also observed that the highest total yield of ions is for the +4 charge state.

In summary, the invention provides an isotopic enrichment process in laser ablation plumes. This effect was demonstrated in the ion energy spectra of laser ablated boron nitride and gallium nitride materials. The effect was first observed using 150–200 femtosecond pulses and has also been seen using 200 picosecond and 6 nanosecond pulses. It appears to be more pronounced in the short pulse case (fs) but is also clearly observable in the longer pulse case (ns). The manifestation of this effect occurs in the yields obtained for the boron 10 compared to boron 11, as well as for gallium 69 versus gallium 71. These isotopes are present in the ionically charged species of the laser ablation plume. The naturally occurring abundance of boron 10 to boron 11 is 19.78% to 80.22%, nominally 20/80 ratio. In the ion energy spectra reported for the enriched zone of the plume, as a function of ion-charge state and ion energy, there are ratios that are greater than 50/50 and in most circumstances always greater than the naturally occurring 20/80 ratio. These differences seem to vary with ion charge state, ion energy and laser pulse duration. In addition, the isotope enrichment is generally larger for gallium, which suggests an important dependence on the target mass.

In the systems described herein, the laser pulse was focused to the surface of the ablation target and the ablation plume left the surface of the target approximately in a normal direction expanding into the region surrounding it. This region constituted a high vacuum or an enclosure containing a dilute background gas. The particles in the plume consisted of electrons, ions, and neutral atoms or molecules. These neutrals may or may not be in excited states. The plume was captured so as to provide zones containing isotope distribution different from the natural abundance. The results, as presented above, are unusual and unexpected. This is because isotope separation, as a process, is normally done by taking advantage of known features such as mass diffusion or difference in atomic vibrational modes. The process described herein is completely different.

While not wishing to be held to any particular theory, one possible explanation for the effect could be found in the nature of atomic collisions for large backward angles in the present case. The laser ablation process is produced when the laser beam is absorbed by the material at its surface resulting in an intensely ionized and very dense plasma. This plasma expands outward away from the surface and inward at the same time. The inward going portion is reflected by the solid surface beneath it and is scattered back in a rearward direction reinforcing the original outward moving plasma front. For ultrafast pulses (fs and ps) the plasma at the surface will be very thin (a few hundred angstroms) and the collisions producing the backward directed motion will consist of predominantly ions that scatter at approximately 180 degrees. The observation angle for the detector is at exactly 180 degrees with, in addition, a very small acceptance angle, on the order of 0.1 degree. In reviewing the above results, several possible phenomena and properties are to be considered. They are summarized here. The effect is restricted to the first few hundred angstroms below the surface of the material. Screened coulomb collision mechanisms and other possible screened potentials seem to pertain. Mass differences play an important role in the process. Shallow angle collisions just prior to the main ultra-low impact parameter backscattering event seem to be relevant to the process. Recoil of the target nucleus seem to be a factor in the enhancement. The angular width of the effect varies with ion energy, charge state and target mass. The effective depth over which the process occurs is a function of ion mass and energy and the target mass. In addition, variations in the plasma distribution can produce a type of electromagnetic lens which selects and focuses ions according to charge state and energy.

Therefore, a filtering effect can be based upon collisional filtering or electromagnetic filtering. It is clear that the plasma plume has an angular distribution pattern with the central cone preferential with the lighter isotope. This is thought to be because when the plume comes off the target, there is an angular distribution pattern for the isotopic species.

All of these parameters seem to be important when comparing light and heavy isotopes that are involved in a wide angle 180 degree scattering event. By using scaling, it is expected that the angular width of the effect observed here will be on the order of 8 to 10 degrees from the surface normal. This will result in an isotopically enriched circular zone of about 1 centimeter radius near the center of the deposited film, if that film is deposited at a typical 7.5 centimeters away from the ablation source. At one meter from the ablation source the angular width will produce a circular zone of enrichment that is on the order of 14 centimeters in radius. It is evident that this process is adaptable to commercial scale-up.

As stated above, data was collected for the 6 nanosecond pulse duration, 150 to 200 femtosecond pulse duration, and also for an intermediate pulse duration of 230 picoseconds. With gallium, the effect at 230 picoseconds appears to be diminished relative to the 150 femtosecond case. With boron, there is no clear trend in B(10)/B(11) ratios from 200 femtoseconds to 230 picoseconds to 6 nanoseconds. In particular, there is a charge state dependent isotope enhancement for certain conditions, shown most strongly in the +3 charge state of FIG. 6B. However, the total yield is decreased in the nanosecond case, relative to the picosecond and femtosecond cases. The gallium and boron data suggests that there is a relative optimum pulse duration for obtaining the ablation effect.

As a result there is a very thin layer on the order of 200 angstroms where the process occurs, the correlated collisions occur within a very shallow depth. This enhancement or optimization of the backscattering mode seems to be dependent on the mass, energy and charge. It appears that the cone in which the effect occurs is dependent on the mass of the scattering atoms. The heavier the mass of the scattering atoms, the bigger the cone. Conversely, the lighter the mass of the scattering atoms, the smaller the cone. From the data obtained in the B(10) and B(11) relationship, it appears to show that the mass effect is there and the charge effect is there. The screen charge appears to be related to why the different charge states provide different isotopic ratios. Therefore, the data clearly suggests there is a mass dependence in the scattering and a charge dependence in the scattering and the width of the cone is controlled by that. Both of these dependencies namely charge and mass are observed in this work.

Backscattering as used herein designates traveling of particles in a direction opposite to that of the path of the energy. In this case, backscattering is not related to the angle of incidence of the laser. In contrast, backscattering as defined herein is the reaction of the particles to the movement of the plasma in a direction into the material. This effect is the result of the formation of the plasma after the laser pulse has delivered its energy.

It is thought that pulse width on the order of hundreds of picoseconds or less, which cause ablation in plasma formation while minimizing thermal effects, are preferred. This generates a relatively dense plasma from which the ions expand. There may be a slight material dependence with respect to the preferred pulse duration or pulse width. Methods for generating short pulses such as 200 ps or less or 10 ps or less are described in U.S. Pat. No. 5,656,186.

It is not fully known from the present experiments if the process is significantly wavelength dependent. Preliminary experiments suggest the effect is very small, or may not be present, for 353 nm (i.e., near UV). The work was done in the near IR at about 1 micron. There could be useful results for the near UV wavelength range since it is known that such laser pulses, even when relatively long and in the nanosecond range, are absorbed over a very thin layer of only a few hundred angstroms. It is therefore thought that the process of the invention is workable in the ultraviolet wavelength range with longer (nanosecond) pulses.

Therefore, wavelength on the order of 198 nanometers (nm) to 2.5 microns is thought to be useful along with pulse widths on the order of nanosecond to femtosecond with energy fluences in the range of millijoules/cm$^2$ to hundreds of joules/cm$^2$ or more, and intensities on the order of $10^9$ to $10^{17}$ watts/cm$^2$. Extreme relativistic electron effects become significant above $10^{18}$ watts/cm$^2$ and could provide new processes relating to the herein observed isotope enrichments. It is thought that the preferred range is 0.8 micron wavelength with 100 femtosecond pulses at $10^{15}$ to $10^{17}$ watts/cm$^2$ laser intensity.

In the case of femtosecond short pulses, the absorption depth of the energy is relatively shallow. In the case of a relatively long wavelength, there may be a trade-off between a relatively deep absorption depth and the length of the pulse. For example, a longer pulse at a longer wavelength is thought to affect a greater depth of material and the isotope enrichment effect may be less as per the data in the 6 nanosecond case.

The process does not have to be done in a vacuum, however that is the cleanest way to get a film. It could be done in a background gas (as shown earlier) and even conceivably in air. Doing this in air (or other gas at atmosphere, or above) could, in fact, be an interesting way to make isotopically enriched particulates. The size of these could be controlled by the gas pressure.

It is not thought that repetition rate of the laser plays an important role except that the growth rate of the film will be affected thereby. The energy level of the laser is important and it is desired to ablate material and form the plume without residual thermal effects into a substantial bulk of the ablated material.

Energetic ions have a very wide range of initial energies and charge states in the laser ablation plasma. As such, they represent a very rich source of diagnostic probe particles. Appropriate detectors can examine spatial and energy distributions of various charge states in order to understand phenomena taking place within the ablation plasma. Experimental results herein show how such swift ionic charge states are affected by passage out of the ablation plume and what effect occurs as a function of observation angle about the normal to the ablating surface. These experiments make it clear that observing energetic ions as a function of energy, mass, and spatial (angular) distribution represents a rich source of information. Such data provides valuable information on the force fields affecting these ions beyond conventional fluid dynamic forces and hydrodynamic processes. FIG. 17 shows an example of such measurement where the effects of laser wavelength and pulse duration are examined relative to isotopic mass ratio analysis.

Interesting variations of isotopic ratios are seen as a function of laser wavelength and particle charge-state. It is thought that these variations are directly related to the time development, strength, and orientation of the magnetic fields in the ablation plasma through which the swift ions pass. Ions of different charge state travel at different velocities relative to the beginning of the ablation pulse. These ions then pass through the plasma magnetic fields at different times relative to the build up and decay of the magnetic fields. Thus, such ions serve as a probe for determining the growth rate and duration of such fields. It is noteworthy that the isotopic separation of ions seen in FIG. 17 is a minimum for experiments done in the UV (353 nm) compared to the IR (1.06 micron) and near IR (780 nm). This implies a wavelength dependence of the magnetic-field-generating mechanisms. The angular distribution of ejected ions as a function of charge state, energy, and mass were examined. These experiments suggest strongly that there are pronounced kinetic energy dependencies to such angular distributions. Again, this is thought to be due to the presence of magnetic fields within the plasma through which the ions penetrated.

Figure 18:
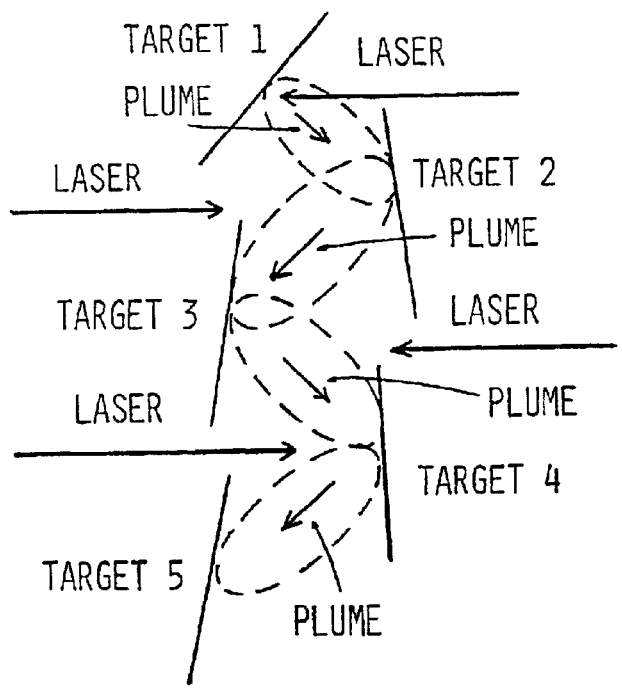
FIG. 18 shows a multi-stage arrangement of laser beams and enrichment targets. The system is useable with laser beams operated simultaneously or sequentially.

FIG. 18 shows a multi-stage arrangement of laser beams and enrichment targets. The system is operable with all laser beams and targets run simultaneously or sequentially. In one embodiment, all targets are the same material, and as time goes on each target is enriched in a selected ionic species. The last target down the chain will have the greatest enrichment, due to the multiplication effect that occurs. If it is desired to achieve enrichment of the lighter isotope, then the laser is directed to the inner conical region of the deposit formed by ablation of the upstream target in the cascade arrangement. It if is desired to achieve enrichment of a heavier isotope, then the laser is directed to the annular region outside the inner conical region of the deposit formed by ablation of the upstream target.

Assuming that the lasers and targets are nominally the same and operation of the laser is the same, a dynamic equilibrium condition arises. Here, the rate of material added, for example, at target 2 is equal to the rate of material removed from target 1. After some desired period of operation, the last target in the chain is the most enriched with respect to a selected isotope.

In another embodiment, the irradiation of targets is conducted sequentially to provide progressively enriched films in the cascade arrangement of FIG. 18. Thus, an initial spatial separation of isotopes occurs by irradiating (ablating) target 1 whereby a deposit is formed having a relatively enriched region and lean region for a selected isotope. Such deposit forms the second target and one of the regions thereof is irradiated to provide further isotope separation.

Significantly, the isotopic enrichment is clearly observed in the ablation ion spectra and in the deposited films. The commercial implications are evident. Products having desired isotope distribution are able to be produced from the process. Multiple iterations of film formation may be used to increase the isotope concentration. The film formed in a prior iteration becomes the subsequent target to produce a desired result. Multiple deposition steps are also useable to form multi-layer films. The process and system apparatus are adaptable to commercial use and automated production. Therefore, isotope enriched products are obtainable by the methods and system of the invention.

Although not wishing to be held to a particular theory, the enrichment effects observed in this work most probably involve interaction of charged ion species in the laser plasma with intense magnetic fields formed by the laser just ahead of the plume expansion process. It is less likely that the observed effects are associated with isotope production through laser-induced nuclear reaction processes. The laser intensities used in this work ($10^{13}$ to $10^{15}$ W/cm$^2$) seem too low for such events to occur. Intensities 4 to 5 orders of magnitude greater are thought to be necessary for photo-induced (n,γ) reactions to occur via optically-energized electrons.

It is thought that both toroidal and axial magnetic fields are generated within laser-induced plasmas and that these fields, near the surface of the ablation target, are on the order of 0.6 MG for laser intensities around $10^{15}$ W/cm$^2$. The time development of the toroidal field precedes that of the axial field and in so doing provides a trans-radial impulse to the ion velocities. The presence of an axial field provides the conditions for a plasma centrifuge mechanism to operate in producing the isotope separation we observe. The intensity of both fields decreases monotonically away from the surface of the ablating target. Data demonstrates that an inverse power law decrease in the axial field occurs over distances of about 150 μm from the ablation surface. By extrapolating an initial 0.5 MG field to large distances, one can estimate the axial field strength along the path toward a deposition substrate on which the isotopically-enriched films are grown. Using a −0.33 power law dependence for the axial field strength as a function of distance for a laser intensity of $2 \times 10^{14}$ W/cm$^2$, there is obtained a spatially-averaged field strength of 44 kG across the 7 cm distance from our ablation target to the deposition substrate. Since the axial field is considered to be produced by a dynamo action within the plasma itself, one might expect that the field is retained within the plasma plume as it moves toward the deposition site. This would provide the necessary geometry for a plasma centrifuge-like condition to be established. Such a process provides a mechanism by which enrichment of the light isotope occurs on the zero radial spot of the plume.

A basic plasma centrifuge equation yields a separated enrichment ratio in terms of the radial distance from the center of an axial magnetic field: $R(r)/R_0 = \exp(\Delta m \omega^2 r^2 / 2kT)$, where $R(r)$ is the ratio of the heavier to lighter ion species at radius r normalized to the ratio on axis, $R_0$. The enrichment depends on the isotope mass difference $\Delta m$, the angular plasma rotation rate ω, Boltzmann's constant k, and the plasma temperature T. Based on the data shown in FIG. 14, for a factor of 2 enrichment and a radial separation of enriched isotopes of 2.5 cm, there is a rotation rate of $3.3 \times 10^5$ rad/sec. The value of the equilibrium plasma temperature is taken as 0.5 eV and is based on typical electron temperatures measured for similar pulses in titanium using optical emission line ratios from spectroscopic emission data. Comparing the present results with the operating parameters of conventional plasma centrifuges allows for an estimate of the magnetic fields involved in the present experiments. Using this approach, the present minimum plasma rotation rate corresponds to a uniform axial magnetic field distributed over the space between the ablation target and film substrate of 4 kG. As stated above, the extrapolated spatially-averaged field across this region is 44 kG. Thus, the predicted average axial field is more than sufficient to cause the isotope separation observed in the present experiments.

Accordingly, a plasma centrifuge mechanism is consistent with the results presented here.

The present invention also provides a method for measuring internal magnetic fields of laser ablation plasmas. This is a uniquely valuable scientific result, in addition to the use of the inventive technique as a simple and direct means to obtain isotopically-enriched materials. It is also useable to obtain other fundamental information about laser plasmas derivable from such observations. This includes information about ion and electron densities, internal atomic and ionic collisions, ion and electron temperatures, ion accelerating fields, and other internal electromagnetic field conditions. From a practical standpoint, the direct deposition of engineered isotopically-enriched thin films is an important advantage provided by the present invention.

Enhanced Ionic Yield

Figure 19A:
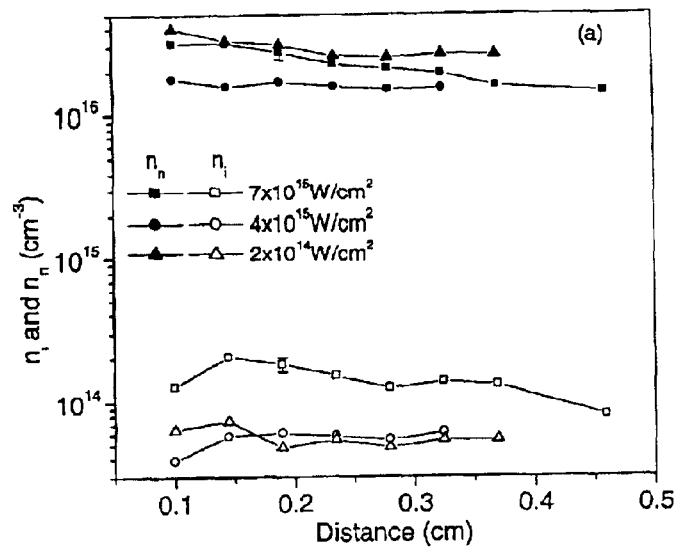
FIG. 19 contains two graphs showing ionic ($n_i$) and neutral ($n_n$) concentrations in a laser ablation plume formed by 100 fs pulses in FIG. 19A and 10 ns pulses in FIG. 19B, at intensities shown in the data box.
Figure 19B:
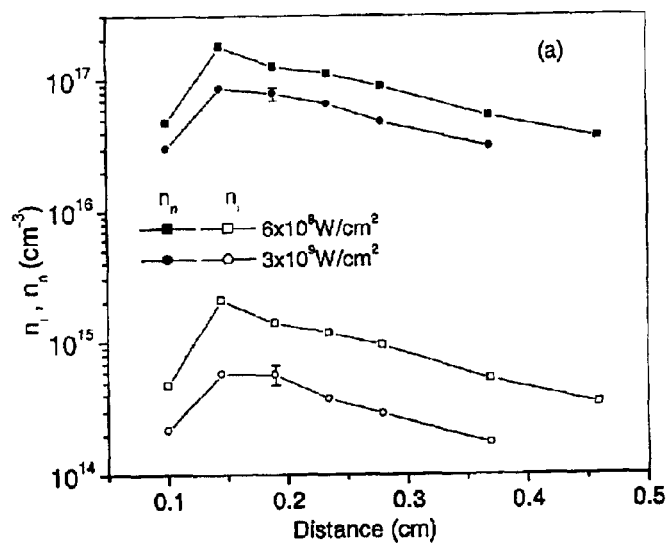

FIG. 19 contains two graphs showing ionic ($n_i$) and neutral ($n_n$) concentrations in a laser ablation plume formed by 100 fs pulses in FIG. 19A and 10 ns pulses in FIG. 19B, at intensities shown in the data box. As stated in the background section of this application, it can be seen in FIG. 19 that the ratio of ions to neutrals in a single ablation plasma plume is relatively small. Typically that ratio is on the order of 1% or less. To achieve a practical method for using this phenomenon as a way to harvest enriched isotopes, it would be desired to increase this ionic component to much greater levels.

A single laser ablation plume is the result of a number of relatively complex processes occurring during the absorption of a laser pulse by a material and subsequent expansion of the gaseous/plasma plume. One part of this process involves the initial production of a very large percentage of ions if not complete ion content in the vapor phase plasma. In other words, the system starts out as a fully ionized electron-ion plasma. Because of the high initial density and ensuing collisions in at the early vapor/plasma stage, however, a great deal of electronic neutralization occurs as the plasma expands away from the surface of the ablating material. This highly neutralized plasma then moves through the region of the self-generated magnetic field and the ionic component undergoes the isotope enrichment.

A plasma having a density which exceeds a certain level, known as the "critical density", begins to reflect optical radiation rather than absorb it. The absorption properties of a plasma normally increase with the density of free electrons in it. However, when the density reaches the critical density the plasma becomes nearly totally reflective. This limits the amount of internal energy that can be added to a plasma by a laser pulse. In most cases where an ablation plasma is formed by a laser this critical density is achieved in the early part of the laser pulse impinging on the surface of the material.

Figure 20:
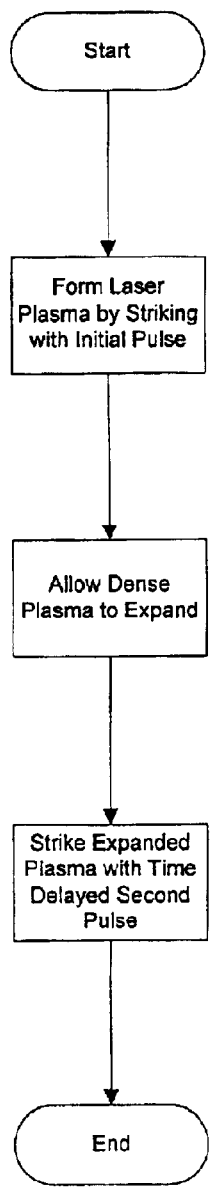
FIG. 20 is a flow chart illustrating one embodiment of the present invention in which an initial laser pulse is directed at a target to create a plasma and then a time delayed second laser pulse is directed at the plasma to increase the ionic component.

Referring to FIG. 20, another embodiment of the present invention is illustrated. In this embodiment, the ionic fraction is increased by first forming the plasma by striking the target with an initial laser pulse and then allowing the dense plasma to expand. The laser pulse is selected to have an intensity and wavelength sufficient to generate a plasma comprising ionized isotopic species and to generate an internal electromagnetic accelerating field within the plasma causing spatial separation of the ionized isotopic species.

The expanding plasma increases its volume thereby decreasing the plasma electron density. This allows the density of the plasma to reduce and to become equal to or less than the critical density. During the expansion process a certain degree of neutralization occurs in the plasma. This additionally reduces the free electron concentration.

After a pre-selected period of time elapses from the time of the initial laser pulse, that is, after the plasma is allowed to expand a desired amount, a second laser pulse is directed to strike the plasma. The time delay of the second pulse is measured relative to the initial laser pulse but is coordinated with the state of the expanding plasma. By striking the plasma with a correctly delayed second pulse, the plasma increases its absorption of additional energy and its ionic component.

The correct time separation between the initial pulse and the second pulse is a very important aspect of the present method. If the plasma expansion is allowed to progress too long, the plasma density becomes too low to efficiently absorb energy. If the plasma expansion is not allowed to progress long enough, the plasma density does not reduce sufficiently relative to the critical density to allow efficient absorption of energy.

The present method also includes a technique for identifying the time delay desired to maximize the absorption of the second pulse and to thereby improve the isotopic enrichment effect. Referring to FIG. 21, plasmas of silicon are studied and the yield and average energy of the ionic component in the ablation plume as a function of time delay between the initial or originating laser pulse and the second or pumping laser pulse is shown. The energy and associated flux density in the ablation plasma are a function of the percentage of energy extracted from the incoming laser pulse at the target. In FIG. 21, the central axis of the expanding plume is being examined.

FIG. 21 shows the results of measuring total ion yield and average energy in a pre-formed ablation plume generated by a 120 femtosecond (780 nm) laser pulse followed by an identical time delayed pulse. The single pulse at zero delay has an energy fluence of 2.2 kJ/cm$^2$ on a beam spot diameter of 42 microns. The two double pulses have an energy fluence of 1.1 kJ/cm$^2$ each. The expansion distance is based on a measured average ion velocity of $1.9\times10^7$ cm/s. Time delays between 0 and 40 picoseconds are illustrated.

It is seen in FIG. 21 that for the conditions of this particular experiment, the maximum enhancement above the single laser pulse result occurs at a time delay of between 1 and 10 picoseconds, and more particularly between 3.5 and 6.5 picoseconds, and even more particularly, at approximately 5 picoseconds. This increases the ionic yield by a factor of about 2.4 over a single pulse with twice the energy of each of the double pulses. In this example it is assumed that the plasma has expanded from a density greater than the critical density (an overdense stage) to the critical density in the intervening 5 picoseconds. At this density or below, the plasma again becomes an efficient optical absorber.

From the foregoing, it can be concluded that the onset of expansion in the plasma occurs at less than 0.50 +or −0.15 ps. This is because the incident laser pulse produces a dense electron-hole solid-state plasma in the time interval during the first laser pulse delivery. As a result of the high energy density in this system, a very strong, temperature dependent, electron-lattice shock coupling dominates and drives the process of converting the solid to a vapor plasma in sub-picosecond time intervals. Subsequent expansion of this plasma takes the plasma from an overdense state to a critically dense state and then to an underdense state. Critical density occurs when the laser frequency and the plasma frequency are equal.

FIG. 22 shows an experiment similar to that of FIG. 21 except the experiment of FIG. 22 is for boron isotope enrichment in a pre-formed plasma. In FIG. 22, the isotope enrichment on axis for BN ablation was initiated by a single 120-fs pulse (780 nm at 10 Hz) having an energy fluence of 2.2 kJ/cm$^2$ and compared to those initiated and pumped by two pulses of half that energy fluence (1.1 kJ/cm$^2$) each and separated by 10 ps. The total laser intensity was $2\times10^{16}$ W/cm$^2$ and the natural abundance is normalized to 1. In FIG. 22 the normalized ratio of $B^{10}$ to $B^{11}$ is shown for the two cases, as a function of charge state. While the stated energy fluences were employed, energy fluences in a range of $10^9$ to $10^{18}$ W/cm$^2$ are preferred depending on the material selected for the target.

It can be seen in FIG. 22 that the time delayed, double laser pulse method shows an enhancement of enrichment for all charge states. A time delay, in this case 10 picoseconds, results in an increase of the total ionic isotope enrichment by about 28% over that obtained with a single pulse. For a charge state of +2, the improvement in enrichment is about 60%.

The data illustrated in FIGS. 21 and 22 confirm the concepts as stated above relating to the use of time delayed laser pulses for pumping the ionic component of a laser plasma to increase isotopic enrichment on the central axis of the plume and further to use laser pumping to increase the efficiency of isotope separation on the central axis of an ablation plume.

Figure 23:
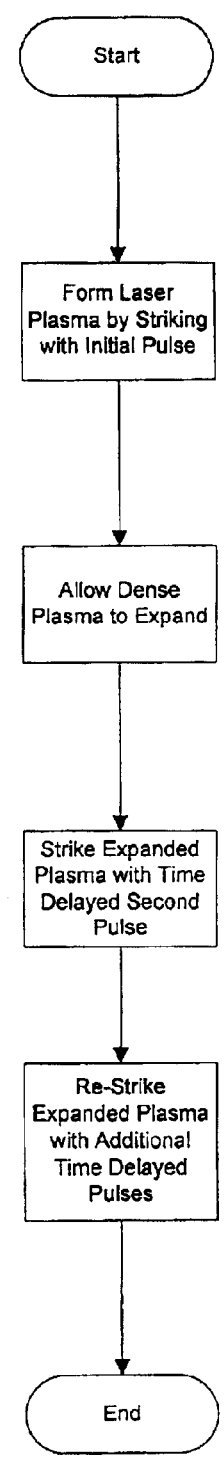
FIG. 23 is a flow chart illustrating a second embodiment of the present invention in which an initial laser pulse is directed at a target to create a plasma and then several individually time delayed subsequent laser pulses are directed at the plasma to increase the ionic component.

Referring now to FIG. 23, a second embodiment method for increasing the ionic yield even further and achieving even higher isotopic enrichment is described. In this embodiment, a plurality of sequentially time delayed laser pulses are directed at the plasma after the initial laser pulse. That is, instead of using one time delayed second or pumping laser pulse as described in FIG. 20, multiple time delayed pumping laser pulses are employed.

The second embodiment method of FIG. 23 is preferred when the second laser pulse which pumps the original plasma causes the plasma to again achieve or exceed critical density. A third pulse is then directed at the plasma, appropriately time delayed, to once again pump the plasma.

If the ionic yield is increased by a factor of 2 with each pump pulse and the single pulse produces a 1% ionic yield, then a 100% ionic plasma can be realized by pumping it n times where: n=Ln100/Ln2=6.64. Thus, by pumping the plasma between 6 and 7 times a 100% ionized condition could be achieved.

If each time delay is on the order of 5 picoseconds, a 100% ionized condition can be accomplished in less than 40 picoseconds. With the plasma velocities being typically $3\times10^6$ cm/sec, the total expansion distance over the 40 picosecond process time amounts to 1.4 microns. This distance is much less than the hundreds of microns over which the plasma magnetic field extends. As such, abundant time and distance exists for the magnetic separation process and associated isotopic enrichment to occur. Even if the plasma velocities became as high as $3\times10^7$ cm/sec, the total expansion distance will not exceed 14 microns, thus continuing to be well within the distance needed to interact with the magnetic fields.

It should also be appreciated that in a multiple pulse operation, the time delay between sequential pulses may be varied to yield enhanced results. In other words, it may be beneficial to delay each pulse differently. It is also possible that varying each pulse duration during the multiple pulse operation could yield enhanced results. As such, the skilled practitioner should recognized that by varying individual pulse separation delays and individual pulse durations, enhanced control over the operation may be realized.

Chemical Separation

The above discussion concerns spatially separating isotopes by mass. An extension of this principal is chemical separation. That is, different chemicals may be separated by mass as well. However, differences in chemistry between the unlike particles may alter the separation character efficiency. Isotopes are less complex to separate in that they have identical chemical properties.

Figure 24:
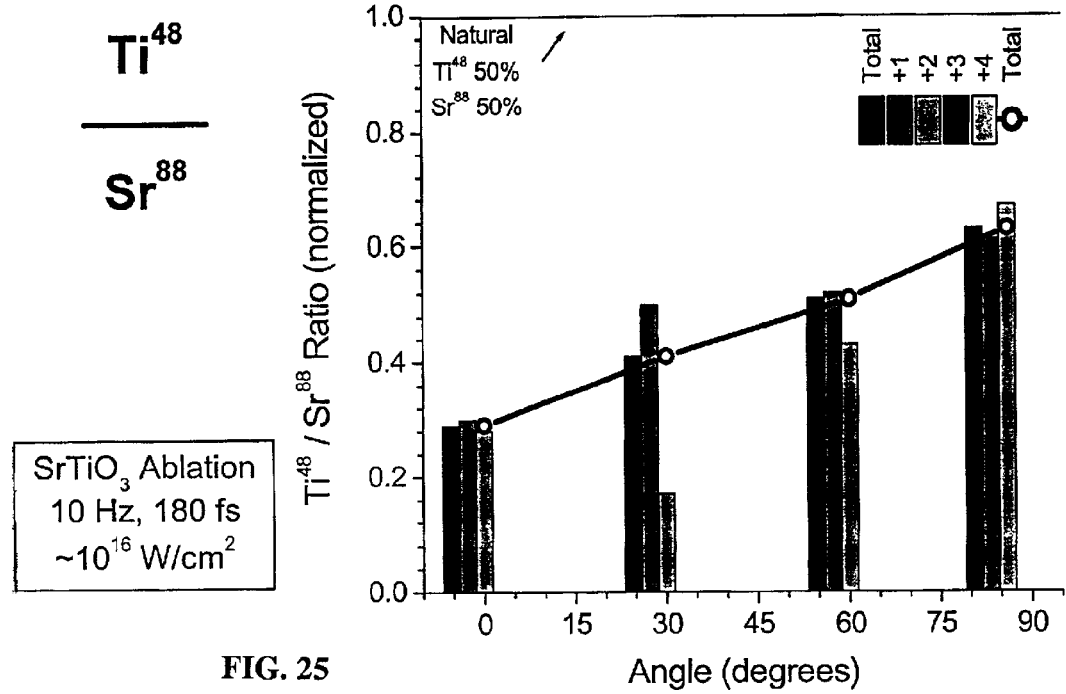
FIG. 24 is a graph illustrating elemental enrichment of Ni and Cu as a function of angle in the ablation plume. The total enrichment ratio is shown first for each angle, followed by each of the ten charge states. The circles and solid line indicate the total enrichment ratio. The actual yield of each charge state and angle is not shown in the graph. It should be noted that the sample ratio of 45% Ni to 55% Cu was normalized to 1.

Referring to FIG. 24, a graph is provided illustrating elemental enrichment of nickel (Ni) and copper (Cu) as a function of angle in the ablation plume. The total enrichment ratio is shown first for each angle, followed by each of the ten charge states. The circles and solid line indicate the total enrichment ratio. The actual yield of each charge state and angle is not shown in the graph. It should be noted that the sample ratio of 45% Ni to 55% Cu was normalized to 1.

Nickel and copper are both metals which are next to each other on the periodic table. Nickel and copper in that regard are both metals with similar chemical properties, and thus separate in a similar way to that of isotopes. FIG. 24 shows that the lighter element (nickel) is more abundant at 0 degrees, just like the case in isotope separation.

Figure 25:
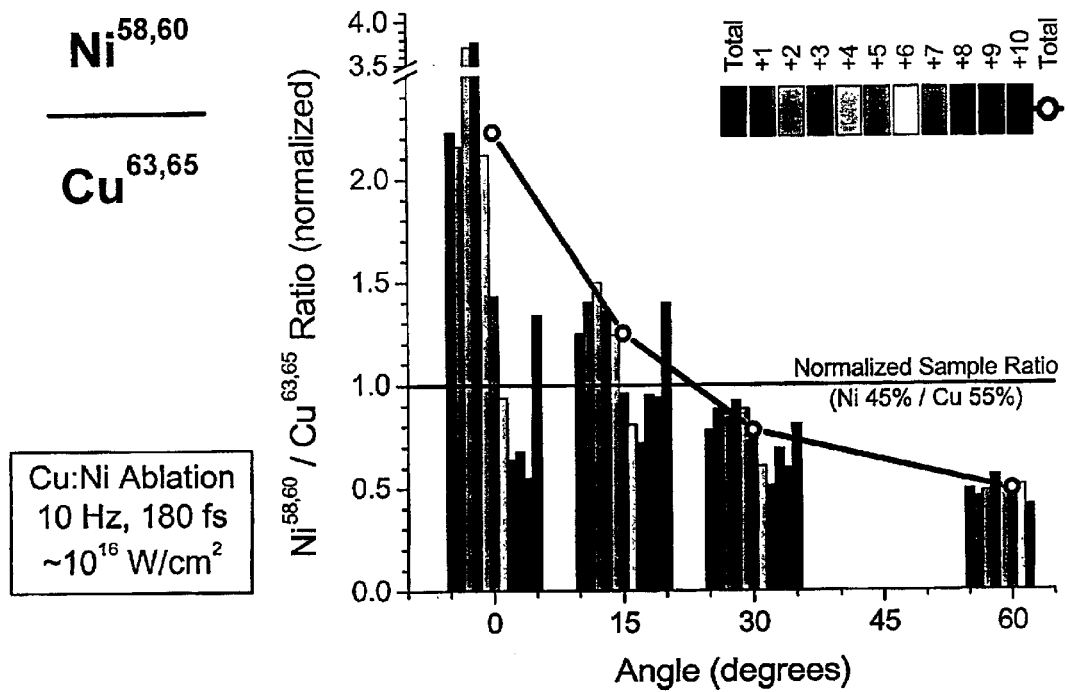
FIG. 25 is a graph illustrating elemental enrichment of strontium (Sr) and titanium (Ti) as a function of angle in the ablation plume.

FIG. 25 is a graph illustrating elemental enrichment of strontium (Sr) and titanium (Ti). Strontium's atomic mass is 88. Titanium's atomic mass is 48. The chemistry of strontium and titanium is quite different in the sense that they have very different electronic structure leading to very different ionic yields and velocity distributions. Thus, they do not separate in the same way as isotopes. In FIG. 25, it can be seen that the heavier element (strontium) is actually more abundant at 0 degrees, in contrast to the isotope case (where the lighter isotope is more abundant at 0 degrees).

The method for conducting chemical separation is the same as for isotope separation. That is, the chemicals are separated based on mass separation in a laser ablation plume presumably by self-generated electric and magnetic fields. The only difference is the target. For Nickel/Copper, a Ni:Cu alloy target was used (45% Ni, 55% Cu). For Strontium/Titanium, a SrTiO3 target was used (strontium titanate). Even though the method is the same, because the two particles in FIG. 25 have very different chemical structures, the separation character efficiency is different. In the case illustrated in FIG. 25 (Sr/Ti), the efficiency is inverted compared to that of isotopes. Other chemical pairs will have varied efficiencies and may differ from that of FIGS. 24 and 25.

As stated above, the method and system apparatus used for chemical separation is essentially the same as the method and system apparatus used for isotope separation. As such, the method includes directing a laser beam onto a surface of a target. The laser beam has an intensity and wavelength sufficient to generate a plasma comprising chemical elements and to generate an internal electromagnetic scattering field within the plasma. This causes spatial separation of the chemical elements.

If desired, the spatially separated chemical may be deposited on a substrate. The deposit would be formed with a first region which is relatively rich in a selected chemical element. A second region would be relatively lean in the selected chemical element.

In the above method, the intensity may be in a range of about $10^9$ watts/cm$^2$ to $10^{18}$ watts/cm$^2$. The wavelength may be in a range of about 200 nanometers to about 10 micrometers. Further, the laser beam may comprise one or more pulses each having a duration in a range of nanoseconds to femtoseconds.

Also if desired, an additional laser beam may be directed onto a selected one of the first and second regions at an intensity and wavelength sufficient to generate a second plasma comprising chemical elements and to generate an internal magnetic field within the second plasma. This causes spatial separation of the chemical elements of the selected region. Thereafter, the spatially separated chemical elements may be deposited on a substrate, whereby a second deposit is formed having a third region with a chemical distribution different from the selected region. This process may be repeated indefinitely to produce a highly enriched separation.

Enhanced Ionic Characteristics

Femtosecond laser-pulse absorption above and below the critical density regime in ablation plasmas by means of a pair of identical collinear laser pulses separated by a few picoseconds is now discussed. The second laser-pulse modifies the ionic characteristics of the pre-formed plasma, such as ion yield, ion energy and average charge state. Maximum effects occur when the density of the initial plasma drops to just below critical density. The enhancement of ion yield is significant compared with that produced by a single pulse with twice the energy of each individual double pulse.

Application of ultrafast lasers to materials synthesis and processing offers interesting new opportunities as compact ultrafast laser systems become more affordable and reliable. Particularly, ultrafast, micromachining, optical emission spectroscopy and pulsed-laser-deposition (PLD) are examples of potential benefits and interests since one can take advantage of the adjustable properties of ablation plumes. These plumes, and the associated plasmas, can be pre-tuned by varying laser pulse parameters such as pulse width, intensity and contrast.

Interacting the initial plasma with a time-delayed second laser pulse can further modify the characteristics of an ablation plume. For example, an experimental investigation was conducted into the enhancement of ionic properties in the plasma portion of ablation plumes from a silicon target resulting from two identical 110 fs laser pulses separated by a few picoseconds. Time-resolved measurements were made of ion flux, ion energy and average charge state to verify that the ionization level and electron density condition of a plasma, initially formed by a single pulse, can be subsequently modified by the pumping action of a secondary time-delayed pulse and that critical density effects could be usefully manipulated.

The laser source used in this experiment was a Ti:Sapphire CPA laser system operated at 10 Hz. The laser provided 110 fs, 36 mJ laser pulses at a wavelength of 780 nm. For this experiment a single laser pulse was split into two identical pulses with a variable time delay using a Michelson interferometer. Resolution of time delay was 0.2 ps. Both pulses were p-polarized and focused collinearly on a silicon target using a 750 mm focal length lens. The incident angle was 45 degrees. The ablation target was mounted inside a vacuum chamber with starting pressure of $5 \times 10^{-8}$ Torr.

In this experimental setup, time-of-flight (TOF) ion signals can be measured using a curved sector electrostatic energy analyzer (with multi-channel plate, MCP, detector) to obtain energy distributions as a function of charge state. Alternatively, the ion flux can be allowed to proceed undeflected into a similar MCP on a straight through port of the analyzer. In the later case an undifferentiated ion flux density is obtained. The entrance of this detector system is normally located at a distance of 150 cm from the ablation target in a separate, differentially pumped, vacuum chamber.

Total ion flux densities, from the straight through port, were obtained by time integration of the TOF signals. Energy distributions, and average ion energy, were obtained from the straight through port by converting the TOF data to kinetic energy. Ion yields as a function of charge-state were obtained using the curved-sector portion of the energy analyzer.

Figure 26:
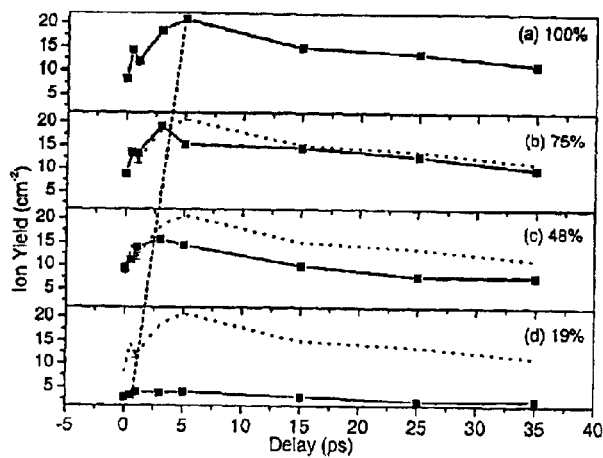
FIG. 26 includes four graphs showing ion yield as a function of time delay between two identical pulses under different laser pulse intensities represented by a percentage of maximum intensity ($1 \times 10^{16}$ W/cm$^2$) shown on sub-figures a–d. Data points at zero delay are produced by a single pulse with twice the energy as each individual time-delayed pulse. Maximum laser intensity results are shown as a dash line on the subsequent laser intensity results.

FIG. 26 shows the total area density of ions in the ablation plume produced by a pair of pulses, as a function of time delay between the pulses, and the laser pulse intensity. The data points at zero delay are the result of a single pulse with twice the energy as that contained in each of the individual double pulses. It also represents the result of delivering the double pulses with zero time delay.

Two effects are observed in the data of FIG. 26a when the second pulse maximally interacts with the plasma formed by the initial pulse. First, the ion yield is three times higher than that produced by a single pulse. This is a result of further ionization of the plasma by the second pulse. Second, ion average energy is increased as a result of the second pulse. Ion kinetic energy is 9 keV using the double pulses separated by 5 ps compared with 6 keV using a single pulse. It is probable that these results are a consequence of the bipolar electrostatic field, responsible for ion acceleration, being sustained and reinforced by additional electrons from the second laser pulse so that ions are experiencing a stronger field for a longer period of time.

In FIG. 26(a) the maximum enhancement occurs at a 5 ps delay between the initial and subsequent pulse. This implies that 5 picoseconds are desired to allow time for sufficient expansion of the initially over-dense plasma, produced by $1 \times 10^6 W/cm^2$, to develop and drop below critical density. Once the plasma density reaches critical density, and goes slightly below, it can again become an efficient optical absorber.

Critical density is defined here in the usual way as, $n_c = m\omega^2/4\pi e^2$ where $n_c$ is the electron density, m the electron mass, $\omega$ the laser wavelength, and e the electronic charge. For the wavelength of our experiment (780 nm), the critical density is $1.7 \times 10^{21}$ electrons/$cm^3$. The plasma functions as a highly reflective media above this density and is absorbing just below. At a sufficiently low density the plasma becomes essentially transmissive.

The absorption properties below critical density increase with electron density up to the critical point whereupon the plasma becomes reflective and absorbs inefficiently in a shallow skin depth. Based on these arguments and a self-similar expansion model for the ablation plasma an estimate can be made of the initial plasma density prior to expansion. For the plasma of FIG. 26a to achieve critical density in 5 ps, with a known average velocity of $1.8 \times 10^7$ cm/sec, the plasmas initial density would have to be $6 \times 10^{21}$ $cm^{-3}$. This is approximately 3.5 times higher than critical density, at the wavelength being used.

The onset of expansion is seen to occur in FIG. 26 at less than 0.5 ps. This implies a very strong coupling of laser energy to the plasma in sub-picosecond time intervals. It can be inferred from this, that as a result of the extremely high energy-density in the electronic sub-component of the plasma, a strong electron temperature-dependent shock coupling to the lattice occurs. This process results in the conversion of the solid material to a vapor-state plasma in sub-picosecond time intervals.

Ion yields as a function of pulse separation are plotted in FIGS. 26(b) (c) and (d) using 75%, 48% and 19% of maximum laser intensity respectively. In comparing these data, the ion yield and average energy enhancement factors systematically decrease with laser intensity. This is presumably because the initial plasma densities for the higher intensities are significantly above critical density and, after sufficient expansion time, can be pumped back up to the higher ionic density and energy level.

However, those at the lower intensities are closer to the critical level and present a more tenuous plasma to the secondary pulse. In these cases, especially for FIG. 26(d), which represents results produced by laser pulses with 19% of the maximum intensity, the initial plasma densities are probably close or below critical density. Under such circumstances, as the plasma expands the density decreases further below critical density and therefore the second laser pulse, in penetrating such a dilute plasma, has limited effects on both ion yield and ion kinetic energy.

In further support of this argument, it is clearly seen, by the diagonal dashed line running from FIG. 26(a) through FIG. 26(d), that less time delay is required to reach the maximum enhancement as laser intensity decreases. This peak shifting effect is considered to be a result of the initial density of the laser-produced plasmas being less at the lower laser intensities and ultimately being sufficiently low so as to approach the critical density.

If an approximately linear decrease of initial plasma density with laser intensity is assumed, the initial $6 \times 10^{21}$ $cm^3$ density of FIG. 26a is reduced to $1.2 \times 10^{21}$ $cm^3$ at the 19% level in FIG. 26d. As pointed out above, this is slightly below the critical density of $1.7 \times 10^{21}$ $cm^3$. The desired density therefore is between about 65% critical density to about 100% critical density. In the case of FIG. 26d, the second pulse essentially penetrates the initially formed plasma at all delays and adds to the single plume density to provide a relatively constant ion flux density at all time delays.

Figure 27:
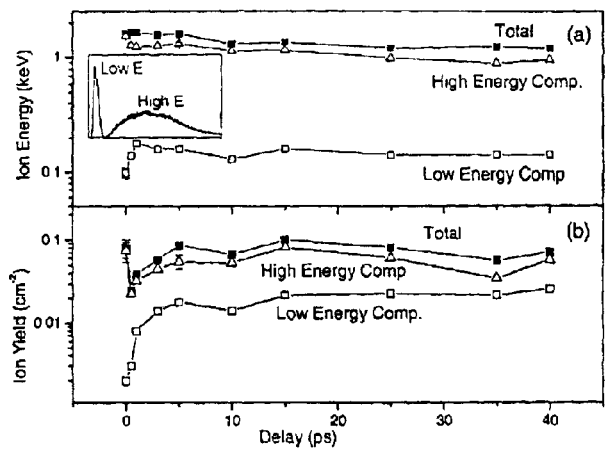
FIG. 27 includes two graphs showing average ion yield and energy as a function of delay time. The intensity of ablation laser pulse is 6% of the maximum ($6 \times 10^4$ W/cm$^2$). Two-component energy distribution is shown in the inset and ion yield and energy of each component are also plotted.

FIG. 27 shows the distribution of charge states for the single and double pulses at maximum laser intensity. The average ion charge in the plume for the case of a single pulse is 2.5 and it increases to 3.1 in the case of a double pulse with a 5 ps time delay, and 3.0 for a 10 ps delay. The inset in FIG. 27 shows the general single mode shape of the energy distribution for the higher intensities used in FIGS. 26 and 27.

It can be seen in FIG. 27 that absorption of the second pulse results in a significant increase of the higher charge state ions (+5 to +7) while having modest or no effect on the number of low charge state ions. The collisional-radiative equilibrium (CRE) plasma model can be used to describe such plasma ionization dynamics. This model normally shows an increase in the number of higher charge-state ions at the expense of lower charge states as the plasma temperature increases. This is not the case for the data of FIG. 27.

The increase of average ionic charge does not occur at the expense of the low charge state ions but rather by only generating a larger number of high charge state ions. These additional contributions to the high charge states may be associated with the absorption of the second pulse predominantly in the leading edge of the expanding plasma, which is where the high-velocity high-charge state ions normally reside. One can expect resonance absorption to be in effect with p-polarized light, which is incident at a 45-degree angle, resulting in preferential absorption near the front critical surface of the expanding plasma.

Figure 28:
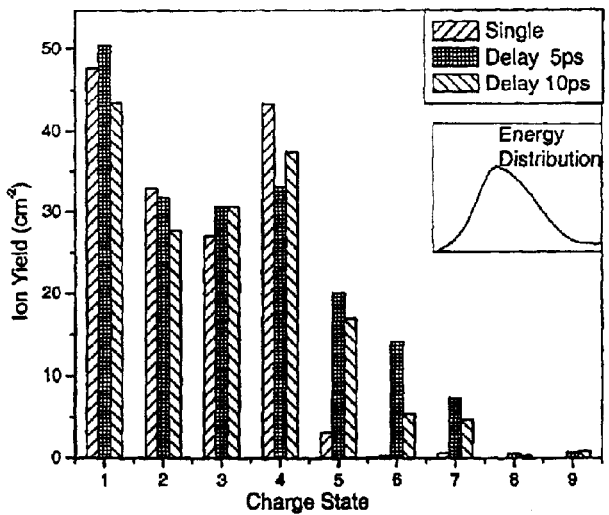
FIG. 28 is a graph showing the charge-state distribution in a silicon ablation plume as a function of single full-energy pulse and time delayed (5 ps and 10 ps respectively) half-energy pulses. Ion energy distribution is shown in the inset and the peak is at 9 keV.

If the laser intensity is further reduced below that of FIG. 27 a new and more subtle effect emerges. FIG. 28 shows ion energy and ion yield in an ablation plume produced by laser pulses with 6% of maximum intensity ($6 \times 10^4$ W/$cm^2$ as a function of time delay. A characteristic ion energy distribution is shown in the inset of FIG. 28 and consists of two components rather than the single large component shown in FIG. 27. As shown before, the low energy component, centered at 100 eV, is relevant to the hydrodynamic expansion, while the high-energy component, centered at 1 keV, is driven by the internal bi-polar plasma electrostatic field.

As shown in both FIGS. 27(a) and (b), the overall (total) ion energy and yield are essentially unchanged when using single pulse or double pulse. However, when the two components (high energy and low energy) are considered separately, a significant time delayed signal enhancement is found for the lower-yield low energy component.

These results suggest that the density of the hydrodynamic component in the plasma produced with the 6% laser intensity is closer to (or above) critical density compared to that of the high-energy component. The time-delayed second laser pulses are therefore able to more effectively modify characteristics of the low energy ions. Furthermore, since the low energy component expands relatively slow, the range of time delay giving ion yield enhancement is wider than that shown in FIG. 26(a).

Since high-energy ions are dominant in the yield for the overall (total) ion distribution in terms of percentage, the total ion response does not reflect the enhancement associated only with the low energy component. The broad energy distribution of the high-energy component in FIG. 28 suggests that it is more tenuous than the low energy component, which has a narrower energy distribution. In these expanding plasmas the high velocity ions spread out ahead of the low energy ones to produce a spatially distributed concentration distribution. The single mode spatial distribution of FIG. 27 results from the merging of the two component bi-modal distribution for plumes generated at those higher laser intensities.

In summary, double pulses separated by picoseconds effectively increase ion yield, ion kinetic energy and average charge in the plasma compared with those produced by a single pulse with twice the energy of each individual pulse. The maximum enhancement occurs whenever the plasma reaches a level close to or slightly below critical density so that it can effectively absorb the second laser pulse. The time-resolved enhancement is therefore an interesting method for performing plasma expansion processes. Furthermore, since the internal electromagnetic field can be sustained or reinforced by the second pulse, effects such as isotope separation can be enhanced using the double pulse technique.

An operational approach can be envisioned where multiply sequenced pulses are used to maximize the ionic component of the plume, where the number of pulses may be on the order of 5 to 10, each one taking the plasma back to critical density in a nominal 5 ps time interval. A highly ionized plume could then be achieved in a time interval of 30 to 50 ps.

Angular Distribution of Mass Enrichment for Heavy Ions

The following concerns spatial mass enrichment of chemical and isotopic ions in laser plasmas generated in ablation plumes and particularly from an alloy of Ni/Cu using ultrafast laser pulses. It is shown that ions of chemicals with neighboring masses can be enriched in these plasma plumes similar to the way in which isotopes are enriched. Comparison of angular distributions for the ratios of the elements nickel ($m_{Ni}$=58.71) and copper ($m_{Cu}$=63.54) are made with those found for similar alloy plasmas subjected to conventional plasma centrifuge processes. The results for both chemical species and nickel isotopes support a plasma centrifuge mechanism for the spatial enrichment of these heavy ions in the ablation plasma plumes.

As described above, spatial isotope enrichment for boron can be achieved on the central axis zone of an ultrafast laser ablation plume. Similar results have been demonstrated by the present inventors for a wide range of heavy ions using a variety of laser pulse durations and wavelengths. Although some preliminary data on angular distributions for boron enrichment in ablation plasmas was previously collected, its support for a plasma centrifuge mechanism was somewhat inconclusive. The following shows that such a centrifuge mechanism is rather strongly supported by direct comparison of chemical and isotopic enrichment as a function of angle about the normal to the ablation surface.

The chemical separation is based on examining plasmas generated from alloys of nickel and copper (Ni 45%, Cu 55%) where the average alloy mass is 61.37 mass units and the species mass difference is 4.85 mass units. In this case $\delta m/m$ is $4.85/61.37=7.9\times 10^{-2}$. For the case of boron isotope enrichment the $\delta m/m$ was $1/10.81=9.9\times 10^{-2}$. Since these numbers are similar, it might be expected that the alloy system would show a similar behavior to that of the boron isotopes, where now however two different chemical species are studied rather than two different isotopes of the same chemical.

Going beyond the similarity in differential mass ratio, it is instructive to examine the isotopes of nickel ($^{58}$Ni and $^{60}$Ni), which are representative of a relatively heavy element. In this case $\delta m/m$ is $2/58.98=3.4\times 10^{-2}$ which is about a factor of 3 smaller than for boron isotopes. It is instructive to examine this case since if a plasma centrifuge process is in effect, the relative spatial mass separation for nickel isotopes should be similar to that of boron, since a centrifuge mechanism is inherently independent of $\delta m/m$ ratios. Most other mass separation mechanisms, and especially hydrodynamic mechanisms, tend to rapidly become ineffective as this ratio decreases.

Figure 29:
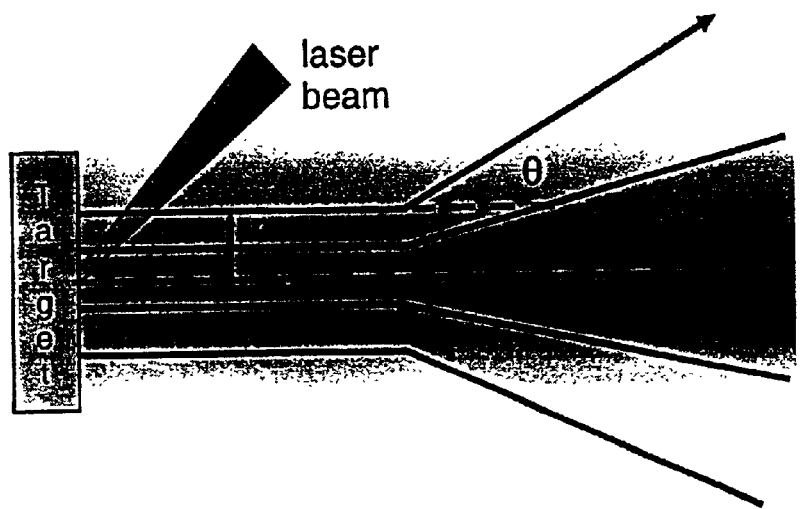
FIG. 29 illustrates a coordinate transformation showing the relationship between the one-dimensional cylindrical zone of the plasma centrifuge and the three-dimensional expansion zone with the angular distribution associated with the ablation plasma.

The angular distribution of enrichment about the normal to the ablating surface is an important physical property to be examined. If a centrifuge process is in effect, this distribution should follow the centrifuge equation in relation to angle and be conformally related to the results obtained from a conventional cylindrical centrifuge in relation to radius. The transformation between these two coordinate systems is shown in FIG. 29 where the model of the present invention is depicted.

As described above, the generation of a laser-plasma by an ultrafast laser pulse involves the absorption of laser energy by the electrons in the solid and the transfer of that energy to the atoms and ions in the material structure. This happens on a very short time scale on the order of a picosecond or so. The expansion of the ablation plasma occurs initially as a one-dimensional expansion process moving along the z-axis normal to the surface of the ablating material. The plasma converts to a three dimensional expansion process after a distance that is on the order of the laser beam spot dimension.

The isotopic and/or chemical mass separation effects are expected to take place in this one-dimensional zone. This is where the magnetic fields are the strongest and where centrifugal action can occur as a result of high-velocity ionic interaction with the magnetic fields. In fact, it can be shown that the plasma ions are able, in principle, to rotate at the cyclotron frequency in the magnetic fields of the ablation plasma where these field strengths are on the order of 100 K-gauss to 1 M-gauss.

The equilibrium distribution of the ions in the one-dimensional cylindrical zone are similar to that achieved in a conventional plasma centrifuge. When the ions move into the three-dimensional expansion zone they move out of cylindrical symmetry and into angular symmetry which is characteristic of a pulsed laser plasma.

FIG. 29 illustrates a coordinate transformation showing the relationship between the one-dimensional cylindrical zone of the plasma centrifuge and the three-dimensional expansion zone with the angular distribution associated with the ablation plasma. FIG. 29 shows an idealized behavior for how these ions would undergo this geometric transformation process. Those ions on the central axis of the one-dimensional cylindrical zone remain on the central axis of the three-dimensional conical expansion zone, whereas the ions nearer the radial perimeter of the one-dimensional cylindrical zone expand out to the largest angles of the three-dimensional conical expansion zone.

The generalized centrifuge equation, valid for isotopic separation in mechanical gas centrifuges or plasma rotating devices, is given as $R(r)/R_0 = \exp(-\Delta m \omega^2 r^2 / 2kT)$ where $R(r)$ is the ratio of the lighter to heavier ion species at radius r normalized to the ratio on axis, $R_0$. The other terms in the equation are $\Delta m$, the mass difference of the species being separated; $\omega$, the angular rotation rate of the centrifuge process; r the radius of the cylindrical zone where enrichment is being observed; k, Boltzmann's constant, and T the absolute temperature of the rotating gas or plasma. In the case of a magnetically driven plasma centrifuge, the rotation rate can be one of two distinct angular frequencies, one at the cyclotron frequency and one at a specific lower rate, proportional to the E×B drift rotation. Derivation and discussion of these two rigid-rotor rates is known in the art.

It is instructive to note that the enrichment process is independent of the actual mass involved and depends only on the difference in mass of the species to be separated. In the experimental arrangement used herein, the mass separation is expected to occur in the one-dimension cylindrical expansion zone. These effects are carried forward into the three-dimensional conical expansion zone. FIG. 29 shows a schematic representation of this process.

Mass separation, by the centrifuge process, results in an ordering/distribution of the high and low mass species along the radius of the one-dimensional cylindrical expansion zone. This ordering of rotational energy is balanced by the randomizing thermal energy kT to result in a steady state distribution.

In an ordinary mechanical or plasma centrifuge device, the radial ordering is observed directly at the end of the cylinder. In the illustrated embodiment, the plasma transitions from the one-dimensional cylindrical expansion zone to the three dimensional conical expansion zone a short distance from the ablation target. It is therefore necessary to map the one-dimensional radial ordering in r to a three dimensional angular distribution in $\Theta$.

For this purpose, an elementary conformal mapping function is used to convert the coordinate r to the angular dimension $r_m(\Theta/\Theta_m)$ where $r_m$ is the maximum radius in the one dimensional zone, and is equal to the radius of the laser beam spot, and $\Theta_m$ is the maximum angle to which $r_m$ maps. This maximum angle is determined from experimental observations. FIG. 29 demonstrates how this transformation is effected. The angular expression for the centrifuge equation is discussed further below. Experimental angular distribution data for the Ni/Cu system, based on these concepts, are presented below. In addition, a discussion of the parameters in the angular form of the centrifuge equation is also presented as support for the magnetic centrifuge model operating in the one-dimensional expansion zone and manifesting itself in the three dimensional expansion data.

Figure 30:
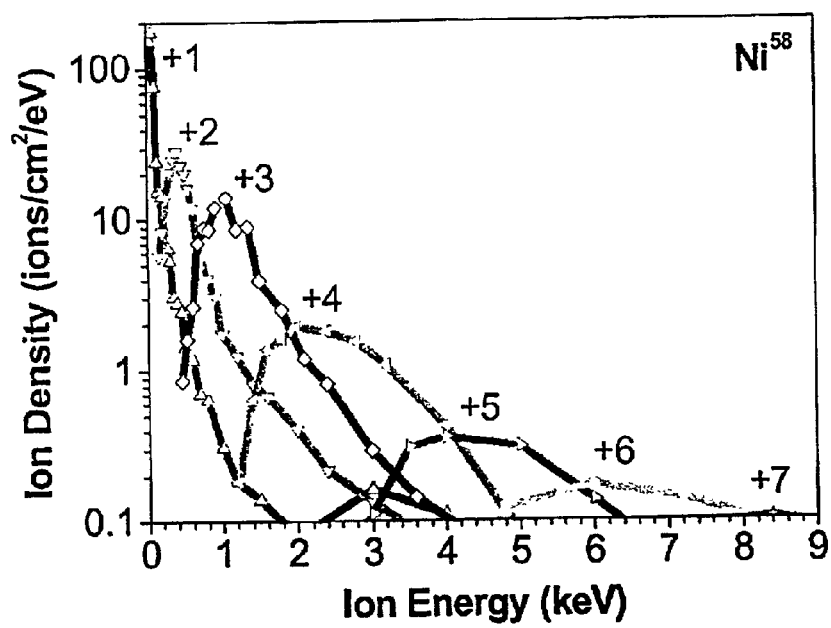
FIG. 30 shows an ion energy density distribution for $^{58}$Ni ions as a function of charge state.

FIG. 30 shows an ion energy density distribution for $^{58}$Ni ions as a function of charge state. These results are similar to those found with boron as described above. The pattern in FIG. 30 is very characteristic of energy distributions in plasmas formed by ultrafast laser ablation plumes. The lowest charge state ions have the highest yield and lowest energies, whereas the highest charge state ions have the highest energy and lowest yields. These data are obtained from an ion energy analyzer operated in a time of flight mode. By collecting data in this fashion it is possible to extract isotopic or mass ratios as a function of ionic charge state. Examining the data in that fashion helps to understand details of the model and provides additional insight to the enrichment process As described above, FIG. 25 illustrates the angular distribution of the ionic ratios representing the chemical mass enrichment in the ablation plasma from the alloy of Ni/Cu. The alloy ratio of 45% Ni and 55% Cu is normalized to unity and the angular scan represents either enrichment or depletion of the Ni ions relative to that of Cu. It is seen that at zero angle the ratio is increased by about a factor of 2.5 above the alloy composition and at 60 degrees the plasma is depleted by an approximately equivalent amount. The behavior illustrated in FIG. 25 is consistent with what would be expected from a centrifuge process as depicted in FIG. 29.

A direct comparison can be made between FIG. 25 and similar experiments done with a conventional plasma centrifuge. In so doing, it is observed that the enrichment using ultrafast ablation is about 2¼ times greater than that observed with a conventional magnetic centrifuge. This presumably is a consequence of the much higher magnetic fields available in these laser plasmas.

Figure 31:
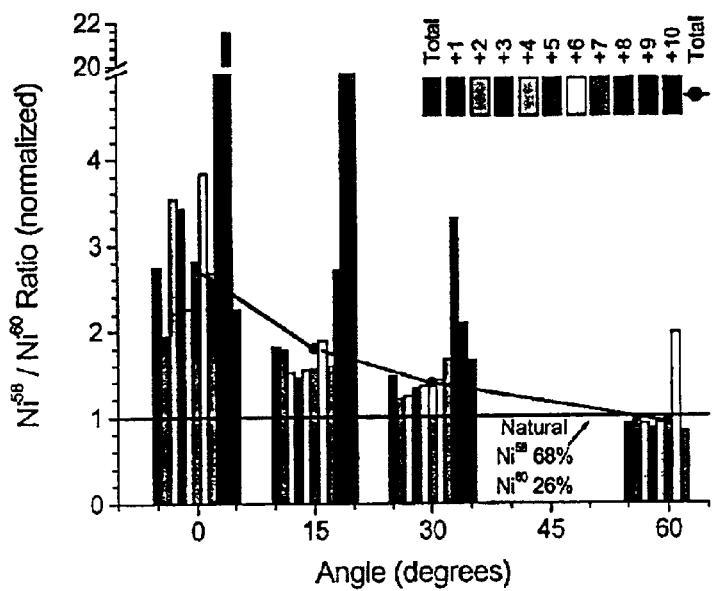
FIG. 31 illustrates the angular distribution for the isotope ratio of 58Ni to 60Ni as a function of ionic charge state.

FIG. 31 illustrates the angular distribution for the isotope ratio of 58Ni to 60Ni as a function of ionic charge state. The general pattern of light isotope enrichment on axis is seen in this data as well as the decrease of this enrichment with increasing angle. The solid circles and solid black line in the FIG. 31 shows the weighted average over all charge states for the enrichment at each of the angles measured, which were 0, 15, 30, and 60 degrees.

The isotopic ratio is seen to come back to slightly less than natural abundance at 60 degrees. The depleted $^{58}$Ni ratios are presumably at the higher angles and compensate for the higher values at zero degrees in a fashion similar to that of FIG. 25.

An unusually high enrichment of the charge state 8 and 9 ions are seen in FIG. 31. These ions represent a small amount of the total ionic yield and therefore do not contribute heavily to the total ionic enrichment. However, the presence of these ions suggests that some interesting physics is occurring to provide enhanced enrichment for these particular species. A similar effect was seen with boron, where charge states 3 and 4 had the highest light isotope enrichment but a low yield.

Figure 32:
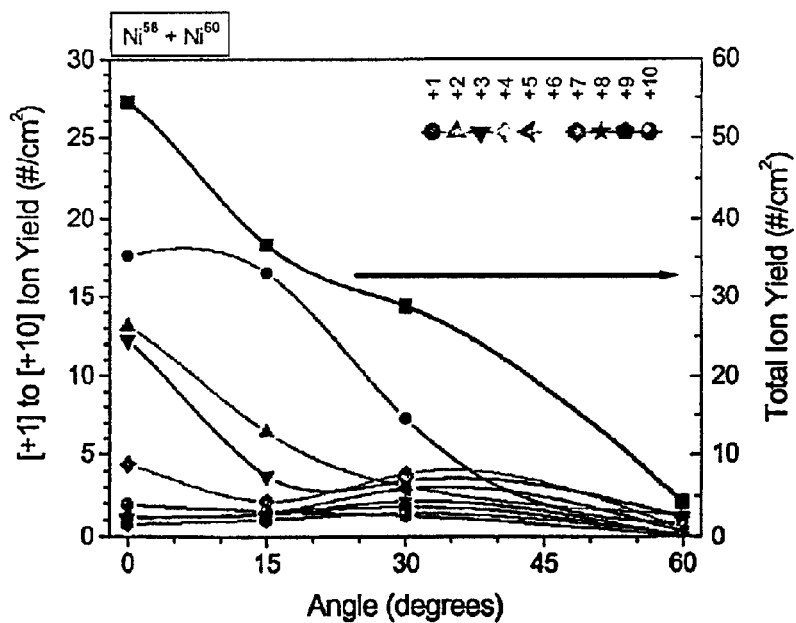
FIG. 32 illustrates the angular distribution of ionic yield as a function of charge state for the combined 58Ni and 60Ni ions.

FIG. 32 illustrates the angular distribution of ionic yield as a function of charge state for the combined 58Ni and 60Ni ions. It is seen that the highest yield results from charge states 1 through 3 with a maximum near the central axis and a minimum at 60 degrees. The remainder of the higher charge state species exhibit much lower total yield at all angles.

FIGS. 25 and 31 provide a set of data that can be used to evaluate the magnetic centrifuge model in relation to the model diagram of FIG. 29. It is shown here that a highly self consistent set of numerical values concerning rotation rates, magnetic field strength, and ion velocities emerge from the model and the data presented.

Starting with the centrifuge equation, as transformed for angular expansion, $R(\Theta)/R_0 = \exp(-\delta m \omega^2 r_m^2 \Theta^2 / \Theta_m^2 kT)$ where all terms are defined as stated above. Inverting the centrifuge equation and solving for the rotation frequency gives: $\omega = [-\text{Ln}\{R(\Theta)/R_0\} \Theta_m^2 2kT / \delta m r_m^2 \Theta^2]^{1/2}$. Using values from FIG. 25; $R_0=2.2$, $R(30°)=0.80$, $\Theta_m=60°$, and $\Theta=30°$. Taking $\delta m=4.85$ mass units for the Ni/Cu system and $r_m=150$ microns (beam spot radius), the angular rotation rate becomes $\omega=7.86\times10^5 T^{1/2}$ where T is the plasma temperature in absolute degrees.

For the centrifuge mechanism to produce an ordering in the rotational energies of the plasma ions and therefore to achieve an appropriate spatial separation, the angular rotation rate must be large enough to balance against the randomizing motion induced by the mean temperature of the plasma. The angular rotation rate scales as the square root of the plasma temperature and must, if the separation is to continue, be driven higher by an appropriate magnetic field as the temperature of the plasma increases. This is an important concept in determining details of the plasma mechanism involved in producing the desired results.

The initial temperature of a plasma, formed by pulses such as those described herein for metallic samples is on the order of 200 ev. After about 20 ns of expansion time this temperature drops to about 1 ev. In the early stages of plasma formation then, the temperature is on the order of $2.3\times10^6$ K requiring a plasma rotation rate of $1.2\times10^9$ rad/sec to achieve the results of FIG. 25. After 20 ns of expansion this rate can be as low as $7.5\times10^7$ rad/sec.

It is recognized here that the centrifuge equation represents a steady state plasma that executes its rotation in a rigid-rotor motion. However, for the sake of discussion, and to establish some order of magnitude sense of the physics involved, single particle motion is examined for clues as to how the process works.

Using the basic equation for the cyclotron rotation rate $\omega_c$ of a charged particle q with mass m, moving orthogonal to a magnetic field B, $\omega_c=2\pi qB/m$, one finds, for an ion of charge state 1, a rotation rate of $9.7\times10^8$ rad/sec per megagauss (Mgauss) of magnetic field strength. Comparing this to the required rotation rate at the beginning of plasma formation implies the presence of a longitudinal magnetic field on the order of 1.2 Mgauss to initially drive the centrifuge mechanism. Field strengths of this magnitude are known to exist in ultrafast laser plasmas.

As the plasma expands forward, the temperature drops and the corresponding field strength drops. Public data suggest that the longitudinal magnetic field drops in an exponential like fashion with a 1/e decrease to 0.44 Mgauss occurring over an approximately 100 micron expansion distance. After 20 ns the required rotation rate implies the presence of a magnetic field on the order of 70 Kgauss. The plasma will have begun to move into the three-dimensional expansion zone by this time.

To further explore the concepts of single particle motion, Larmor orbital radii for cyclotron motion are given as $r_c=v/\omega_c$ where v is the orthogonal linear velocity of the charged ion. If the rotational motion is confined to occur within the laser beam diameter, corresponding to the one-dimensional expansion zone, then the linear orthogonal velocity associated with the experimental rotation rates of $1.2\times10^9$ rad/sec is $2.9\times10^6$ cm/sec, corresponding to an average ion kinetic energy of 0.25 Kev for th elements shown in FIG. 29. It is seen in FIG. 29 that this is approximately the mean kinetic energy measured for the charge-state one ions, which are the most abundant species, observed in the plasma. It should be mentioned however, that the data of FIG. 29 are for the longitudinal velocities and are therefore only representative of the actual orthogonal velocities in the plasma. There is nonetheless good order of magnitude agreement.

It needs to be emphasized that care should be exercised concerning too great a use of the single particle model to describe the collective plasma motions discussed herein. However, a further point of interest is seen in FIG. 31 where the isotopes of nickel appear to reveal a higher enrichment for the higher charge states, implying higher single particle rotation rates for the high charge state ions, as prescribed by the cyclotron equation.

In summary, these experiments provide data that support a magnetic centrifuge model for the ionic enrichment of light isotopes on the central axis of an ultrafast laser ablation plume. The results are similar in relation to the chemical enrichment of nickel over copper from a Ni/Cu alloy as well as for the ratios of the isotopes of 58Ni/60Ni from the nickel component of the plasma plume. The work further confirms earlier results on boron isotopes and on axis data for other heavy ions. The support for a magnetic centrifuge model is found in directly comparing ablation plasma results with the spatial enrichment data published for conventional wire wound magnetic centrifuge devices.

Clusters and Aggregates

Often, small clusters or aggregates form in a laser ablation plume as the plasma expands and cools. These aggregates are not always beneficial and may be a detriment to the process. For example, such an aggregate can interfere with the isotope enrichment process by extracting atoms or ions from the plasma and not letting them participate in the enrichment process.

To prevent such aggregates from forming or to vaporize them once they form, a second laser pulse similar in nature to those described above, that is appropriately timed, can be used. The time delay required can be determined based on testing of particular target material and laser pulse interactions. The second laser pulse may be provided by a second laser but is preferably split off from the main laser pulse and delayed in time with, for example, a Michaelson interferometer. In addition, multiple sequential pulses may also be employed. In the case of aggregates, by maximizing the ionized fraction, the aggregates should automatically be minimized or eliminated with the secondary pulses.

TABLE I

ISOTOPE RATIOS FROM RBS MEASUREMENTS
Ratios Abundances
$B^{11}/B^{10} B^{10}/B^{11} B^{10} B^{11}$

| | |
|---|---|
| Natural | 4.05560.246619.78% 80.22% |
| BN 3169906 | 4.86620.205517.05% 82.95% thin region |
| BN 3169907 | 2.3360 0.428129.98% 70.02% thick region |
| BN 3169908 | 1.87170.534334.82% 65.18% thick region |

TABLE II

Total Boron Ion Counts (integrated over ion energy), separated by isotope and charge state from FIG. 3. Laser ablation plumes are from 200 fs, 50 J/cm² laser pulses in vacuum, and in 0.8 mTorr $N_2$ backfill.

| Charge State $B^{10}$ | Vacuum $N_2$ $B^{11}$Ratio$B^{10}$ | | Backfill $B^{11}$Ratio |
|---|---|---|---|
| +1 | 1.77 | 6.060.29 | 42.19 | 72.440.58 |
| +2 | 3.65 | 10.480.35 | 1.34 | 3.700.36 |
| +3 | 19.03 | 20.090.95 | 2.94 | 7.900.37 |
| +4 | 22.68 | 30.960.73 | | |
| +5 | 5.04 | 10.920.46 | | |
| Total | 52.17 | 78.500.66 | 46.47 | 84.040.55 |

While preferred embodiments, forms and arrangements of parts of the invention have been described in detail, it will be apparent to those skilled in the art that the disclosed embodiments may be modified. Therefore, the foregoing description is to be considered exemplary rather than limiting.

What is claimed is:

1. A method for separating isotopes of an element comprising:
   a) directing a first laser pulse onto a surface of a target at a first energy fluence sufficient to generate a plasma comprising ionized isotopic species and to generate an internal electromagnetic scattering field causing spatial separation of said ionized isotopic species;
   b) after step a), allowing said plasma to expand to a density approximately equal to a critical density of said plasma; and c) after step b), directing a second laser pulse onto said plasma at a second energy fluence to further spatially separate said ionized isotopic species.

2. The method of claim 1 wherein said critical density further comprises a density of said plasma when a frequency of said plasma approximately equals a frequency of said second laser pulse.

3. The method of claim 1 further comprising:
   d) depositing said spatially separated ionized isotopic species on a substrate.

4. The method of claim 1 further comprising:
   d) extracting said spatially separated ionized isotopic species using a carrier gas.

5. The method of claim 1 wherein said second energy fluence is approximately equal to said first energy fluence.

6. The method of claim 5 wherein said first and second energy fluences are approximately equal to 1.1 kJ/cm$^2$.

7. The method of claim 1 wherein said second energy fluence is not equal to said first energy fluence.

8. The method of claim 1 wherein said step b) progresses from about 1 to about 40 picoseconds.

9. The method of claim 1 wherein said step b) progresses from about 3.5 to about 11.5 picoseconds.

10. The method of claim 1 wherein said step b) progresses for about 5 picoseconds.

11. The method of claim 1 wherein said step b) progresses for about 10 picoseconds.

12. A method for separating isotopes of an element comprising:
   a) directing a laser pulse onto a surface of a target having a first isotopic distribution, at an energy fluence sufficient to generate a plasma comprising ionized isotopic species and to generate an internal electromagnetic scattering field causing spatial separation of said ionized isotopic species; and
   b) after step a), directing a plurality of sequentially time delayed pumping laser pulses onto said plasma to further spatially separate said ionized isotopic species;
   wherein the time delay between consecutive pumping laser pulses is sufficient to allow said plasma to expand to a density approximately equal to a critical density of said plasma.

13. The method of claim 12 wherein said critical density further comprises a density of said plasma when a frequency of said plasma approximately equals a frequency of said second laser pulse.

14. The method of claim 12 further comprising:
   c) depositing said spatially separated ionized isotopic species on a substrate whereby a deposit is formed having a region with a second isotopic distribution different from said first isotopic distribution.

15. The method of claim 12 further comprising:
   c) extracting said spatially separated ionized isotopic species using a carrier gas.

16. The method of claim 12 wherein an energy fluence of each of said plurality of pumping laser pulses is approximately equal to said energy fluence of said laser pulse.

17. The method of claim 16 wherein said energy fluence is approximately equal to 1.1 kJ/cm$^2$.

18. The method of claim 12 wherein an energy fluence of each of said plurality of pumping laser pulses is different from said energy fluence of said laser pulse.

19. The method of claim 12 wherein said time delay between consecutive pumping laser pulses is in a range from about 1 to about 40 picoseconds.

20. The method of claim 12 wherein said time delay between consecutive pumping laser pulses is in a range from about 3.5 to about 11.5 picoseconds.

21. The method of claim 12 wherein said time delay between consecutive pumping laser pulses is approximately equal to 5 picoseconds.

22. The method of claim 12 wherein said time delay between consecutive pumping laser pulses is approximately equal to 10 picoseconds.

23. A method for separating isotopes of an element comprising:
   a) directing a laser beam of first laser pulses onto a surface of a target having a first isotopic distribution at a first energy fluence sufficient to generate an internal electromagnetic scattering field causing spatial separation of said ionized isotopic species;
   b) after step a), allowing a plasma of step a) plasma to expand to a density approximately equal to a critical density of said plasma; and
   c) after step b), directing one or more time delayed second laser pulses onto said plasma at a second energy fluence to further spatially separate said ionized isotopic species, the time delay between consecutive second laser pulses being sufficient to allow said plasma to expand to a density approximately equal to said critical density of said plasma.

24. The method of claim 23 further comprising:
   d) depositing said spatially separated ionized isotopic species on a substrate whereby a deposit is formed having a region with a second isotopic distribution different from said first isotopic distribution.

25. The method of claim 23 further comprising:
   d) extracting said spatially separated ionized isotopic species using a carrier gas.

26. The method of claim 23 wherein said second energy fluence is approximately equal to said first energy fluence.

27. The method of claim 23 wherein said second energy fluence is not equal to said first energy fluence.

28. The method of claim 23 wherein said time delay between consecutive second laser pulses is in a range from about 3.5 to about 11.5 picoseconds.

* * * * *